(12) United States Patent
Waitkus et al.

(10) Patent No.: US 11,230,995 B2
(45) Date of Patent: Jan. 25, 2022

(54) CABLE CONDUIT FOR TURBINE ENGINE BYPASS

(71) Applicant: RAYTHEON TECHNOLOGIES CORPORATION, Farmington, CT (US)

(72) Inventors: Christopher Waitkus, New York, NY (US); Mark T. McAuliffe, Colchester, CT (US); Randall Lee Greenberg, Oxford, CT (US); Colby S. Dunn, East Hartford, CT (US); Daniel Godfrey, South Glastonbury, CT (US); Curtis J. Ruckey, Windsor Lock, CT (US); Philip DiMuzio, South Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/933,644

(22) Filed: Jul. 20, 2020

(65) Prior Publication Data

US 2020/0347784 A1    Nov. 5, 2020

Related U.S. Application Data

(63) Continuation-in-part of application No. 15/807,379, filed on Nov. 8, 2017, now Pat. No. 10,727,656.

(51) Int. Cl.
*F02K 3/06* (2006.01)
*F02C 7/00* (2006.01)
(Continued)

(52) U.S. Cl.
CPC .................. *F02K 3/06* (2013.01); *F02C 7/00* (2013.01); *F02C 3/06* (2013.01); *F05D 2220/32* (2013.01);
(Continued)

(58) Field of Classification Search
CPC ...... F02K 3/06; F02C 7/00; F02C 7/05; F02C 9/16; F02C 3/04; H02G 3/0418;
(Continued)

(56) References Cited

U.S. PATENT DOCUMENTS

| 4,987,736 A | 1/1991 | Ciokajlo |
| 5,283,499 A | 2/1994 | Adam et al. |

(Continued)

FOREIGN PATENT DOCUMENTS

| EP | 2278203 | 1/2011 |
| FR | 3034580 | 10/2016 |

(Continued)

OTHER PUBLICATIONS

Waitkus, et al. "Igniter Cable Conduit for Gas Turbine Engine" filed Nov. 8, 2017 in U.S. Appl. No. 15/807,379.

(Continued)

*Primary Examiner* — William H Rodriguez
(74) *Attorney, Agent, or Firm* — Snell & Wilmer L.L.P.

(57) ABSTRACT

A cable conduit for a bypass flow duct may comprise a head end, a sleeve, a foot end, a boot, and a split grommet wherein the head end is coupled to the sleeve opposite the foot end, wherein the foot end comprises a flared portion, wherein the boot comprises a first flange and a neck, wherein the boot is configured to couple at the neck to the flared portion of the foot end, wherein the head end comprises a second flange and a cutout penetrating into an interior volume of the sleeve, and wherein the split grommet is coupled within the interior volume of the sleeve.

9 Claims, 24 Drawing Sheets

(51) Int. Cl.
  *F02C 3/06* (2006.01)
  *F16L 5/14* (2006.01)
(52) U.S. Cl.
  CPC ...... *F05D 2230/60* (2013.01); *F05D 2240/55* (2013.01); *F16L 5/14* (2013.01)
(58) Field of Classification Search
  CPC ........ H02G 3/22; H02G 3/0437; H01T 13/00; H01T 13/08; F01D 9/065; F01D 25/00
  See application file for complete search history.

(56) References Cited

U.S. PATENT DOCUMENTS

| | | | |
|---|---|---|---|
| 5,335,490 A * | 8/1994 | Johnson | F01D 9/065 |
| | | | 60/740 |
| 6,439,841 B1 | 8/2002 | Basel | |
| 7,339,119 B2 | 3/2008 | Hamazu et al. | |
| 10,641,115 B2 * | 5/2020 | Colebrook | F01D 9/041 |
| 2005/0247043 A1 | 11/2005 | Derenes | |
| 2007/0234706 A1 | 10/2007 | Gagneux | |
| 2013/0028718 A1 * | 1/2013 | Strom | F01D 25/162 |
| | | | 415/182.1 |
| 2014/0013770 A1 | 1/2014 | Farah | |
| 2015/0219015 A1 | 8/2015 | Szymanski | |
| 2016/0006226 A1 | 1/2016 | Moisei | |
| 2016/0169050 A1 | 6/2016 | Scott | |
| 2016/0326910 A1 | 11/2016 | Socha | |
| 2016/0341123 A1 | 11/2016 | Socha | |
| 2017/0009620 A1 | 1/2017 | Socha | |
| 2017/0138264 A1 | 5/2017 | Tham | |
| 2017/0292455 A1 * | 10/2017 | VanTassel | F02C 6/08 |
| 2018/0119575 A1 | 5/2018 | Bouiller | |
| 2018/0216493 A1 | 8/2018 | Moniz | |
| 2018/0224043 A1 | 8/2018 | Hendrickson | |
| 2019/0063241 A1 | 2/2019 | Colebrook | |
| 2019/0093507 A1 | 3/2019 | Ward | |
| 2019/0140430 A1 | 5/2019 | Waitkus et al. | |
| 2020/0025004 A1 * | 1/2020 | Dunnigan | F16J 15/061 |
| 2021/0254471 A1 * | 8/2021 | Irizarry-Rosado | C09J 163/00 |

FOREIGN PATENT DOCUMENTS

| | | |
|---|---|---|
| GB | 682449 | 11/1952 |
| GB | 2402266 | 7/2006 |
| WO | 2012066813 | 5/2012 |

OTHER PUBLICATIONS

European Patent Office, European Search Report dated Mar. 14, 2019 in Application No. 18203912.3.
USPTO, Election/Restriction Requirement dated Jan. 13, 2020 in U.S. Appl. No. 15/807,379.
USPTO, Notice of Allowance dated Mar. 17, 2020 in U.S. Appl. No. 15/807,379.

* cited by examiner

CABLE CONDUIT FOR TURBINE ENGINE BYPASS

CROSS REFERENCE TO RELATED APPLICATIONS

This application is a continuation-in-part of, claims priority to, and the benefit of, U.S. application Ser. No. 15/807,379 which was filed on Nov. 8, 2017, and entitled "IGNITER CABLE CONDUIT FOR GAS TURBINE ENGINE," which is incorporated by reference in its entirety.

FIELD

The disclosure relates generally to protective structures for cables and cable pathways in gas turbine engines.

BACKGROUND

Gas turbine engine cables may pass directly through a bypass duct of a gas turbine engine and be exposed to engine bypass flow. The bypass flow environment is a harsh environment tending to damage or degrade cable performance over time and may expose the cable to impact with objects transported in the bypass flow.

SUMMARY

In various embodiments the present disclosure provides a cable conduit for a bypass flow duct may comprise a head end, a sleeve, a foot end, a boot, and a split grommet wherein the head end is coupled to the sleeve opposite the foot end, wherein the foot end comprises a flared portion, wherein the boot comprises a first flange and a neck, wherein the boot is configured to couple at the neck to the flared portion of the foot end, wherein the head end comprises a second flange and a cutout penetrating into an interior volume of the sleeve, and wherein the split grommet is coupled within the interior volume of the sleeve.

In various embodiments, the sleeve includes a forward section and an aft section, wherein the sleeve comprises coupling lobes. In various embodiments, the forward section comprises a first perforation through a forward aerodynamic surface and the aft section comprises a second perforation through an aft aerodynamic surface, wherein the first perforation and the second perforation are in fluid communication with the interior volume of the sleeve, wherein a portion of a bypass flow passes through the first perforation into the interior volume and exits the interior volume through the second perforation. In various embodiments, the boot comprises a first half section and a second half section separable at a seamline. In various embodiments, the boot comprises a pusher plate and a gasket. In various embodiments, a standoff washer is embedded into the gasket. In various embodiments, the sleeve comprises a sleeve locking feature. In various embodiments, the split grommet comprises a mating surface comprising at least one of an extrusion, a finger, a cavity, a pocket, a bore, or an embedded stud. In various embodiments, the gasket comprises a recessed portion configured to receive a flanged portion of the standoff washer, wherein the standoff washer defines a radial gap between the standoff washer and the gasket material. In various embodiments, the sleeve comprises at least one of a circular cross section, an elliptical cross section, an oblate cross section, an angular cross section, a teardrop cross section, or an airfoil cross section.

In various embodiments the present disclosure provides a gas turbine engine comprising a compressor section configured to compress a gas, a combustor section aft of the compressor section and configured to combust the gas, a fan section configured to produce a bypass flow, an outer case having an inner surface and an inner case having an outer surface defining a bypass flow duct there between, a cable conduit, disposed within the bypass flow duct, comprising, a head end, a sleeve having a foot end, a boot, and a split grommet, a head end, a sleeve having a foot end, a boot, and a split grommet, wherein the boot comprises a first flange and a neck, wherein the neck is coupled to a flared portion of the foot end, wherein the head end comprises a second flange having and a cutout penetrating into an interior volume of the sleeve, wherein the split grommet is coupled within the interior volume of the sleeve, wherein the second flange is coupled the inner case and the first flange is coupled to the outer case.

In various embodiments, the cable conduit further comprises a forward section and an aft section, wherein the sleeve comprises coupling lobes. In various embodiments, the forward section comprises a first perforation through a forward aerodynamic surface and the aft section comprises a second perforation through an aft aerodynamic surface, wherein the first perforation and the second perforation are in fluid communication with the bypass flow duct and the interior volume of the sleeve, wherein a portion of the bypass flow passes through the first perforation into the interior volume and exits the interior volume through the second perforation. In various embodiments, the boot comprises a first half section and a second half section separable at a seamline. In various embodiments, the boot comprises a pusher plate and a gasket. In various embodiments, a standoff washer is embedded into the gasket. In various embodiments, the sleeve comprises a sleeve locking feature. In various embodiments. In various embodiments, the split grommet comprises a mating surface comprising at least one of an extrusion, a finger, a cavity, a pocket, a bore, or an embedded stud. In various embodiments, the gasket comprises a recessed portion configured to receive a flanged portion of the standoff washer, wherein the standoff washer defines a radial gap between the standoff washer and the gasket material.

In various embodiments, the present disclosure provides a method of assembling a cable conduit in a bypass flow duct comprising inserting a cable through an outer case and an inner case of the bypass flow duct, inserting a forward section of the cable conduit into the bypass flow duct and coupling the forward section to the inner case, inserting the aft section of the cable conduit into the bypass flow duct and coupling the aft section about the cable to the forward section, coupling the forward section to the inner case, coupling a first half section and a second half section of a boot about the cable such that the cable passes through an annular structure of a neck portion of the boot, inserting the neck portion of the boot into a flared portion of the cable conduit, coupling the boot to the outer case.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1A:
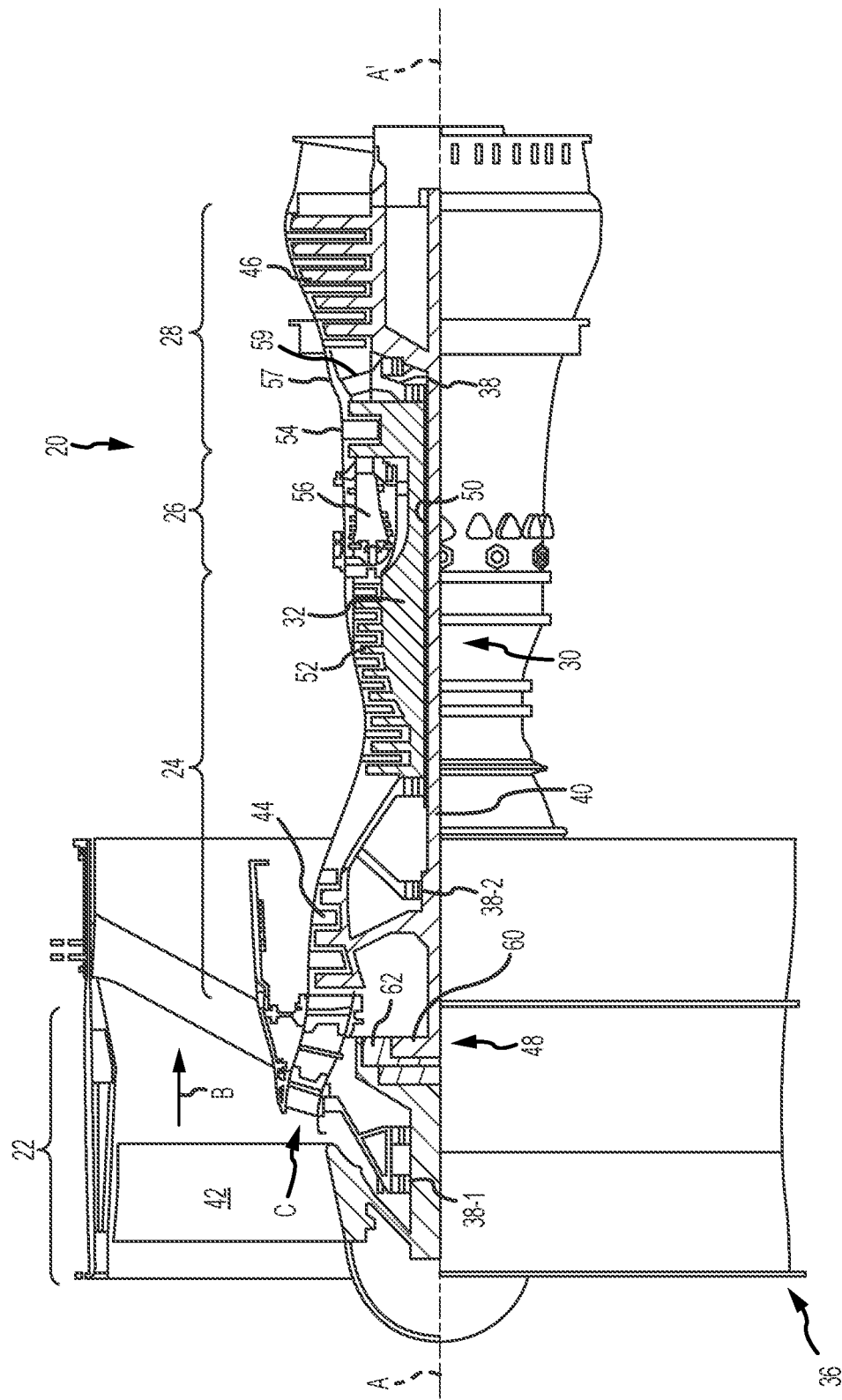
FIG. 1A illustrates an exemplary gas turbine engine, in accordance with various embodiments.

In various embodiments and with reference to FIG. 1A, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via one or more bearing systems, shown as 38, 38-1, and 38-2 in FIG. 1A. It should be understood that various bearing systems at various locations may alternatively or additionally be provided to bearing systems 38, 38-1, and 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46, and high pressure turbine 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

In various embodiments, the next generation of turbofan engines may be designed for higher efficiency which is associated with higher pressure ratios and higher temperatures in the HPC 52. These higher operating temperatures and pressure ratios may create operating environments that may cause thermal loads that are higher than the thermal loads encountered in conventional turbofan engines, which may shorten the operational life of current components.

In various embodiments, HPC 52 may comprise alternating rows of rotating rotors and stationary stators. Stators may have a cantilevered configuration or a shrouded configuration. More specifically, a stator may comprise a stator vane, a casing support and a hub support. In this regard, a stator vane may be supported along an outer diameter by a casing support and along an inner diameter by a hub support. In contrast, a cantilevered stator may comprise a stator vane that is only retained and/or supported at the casing (e.g., along an outer diameter).

In various embodiments, rotors may be configured to compress and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or HPC) to increase and/or improve the efficiency of the engine and, more specifically, to achieve maximum and/or near maximum compression and efficiency when the straightened air is compressed and spun by rotor 64.

Figure 1B:
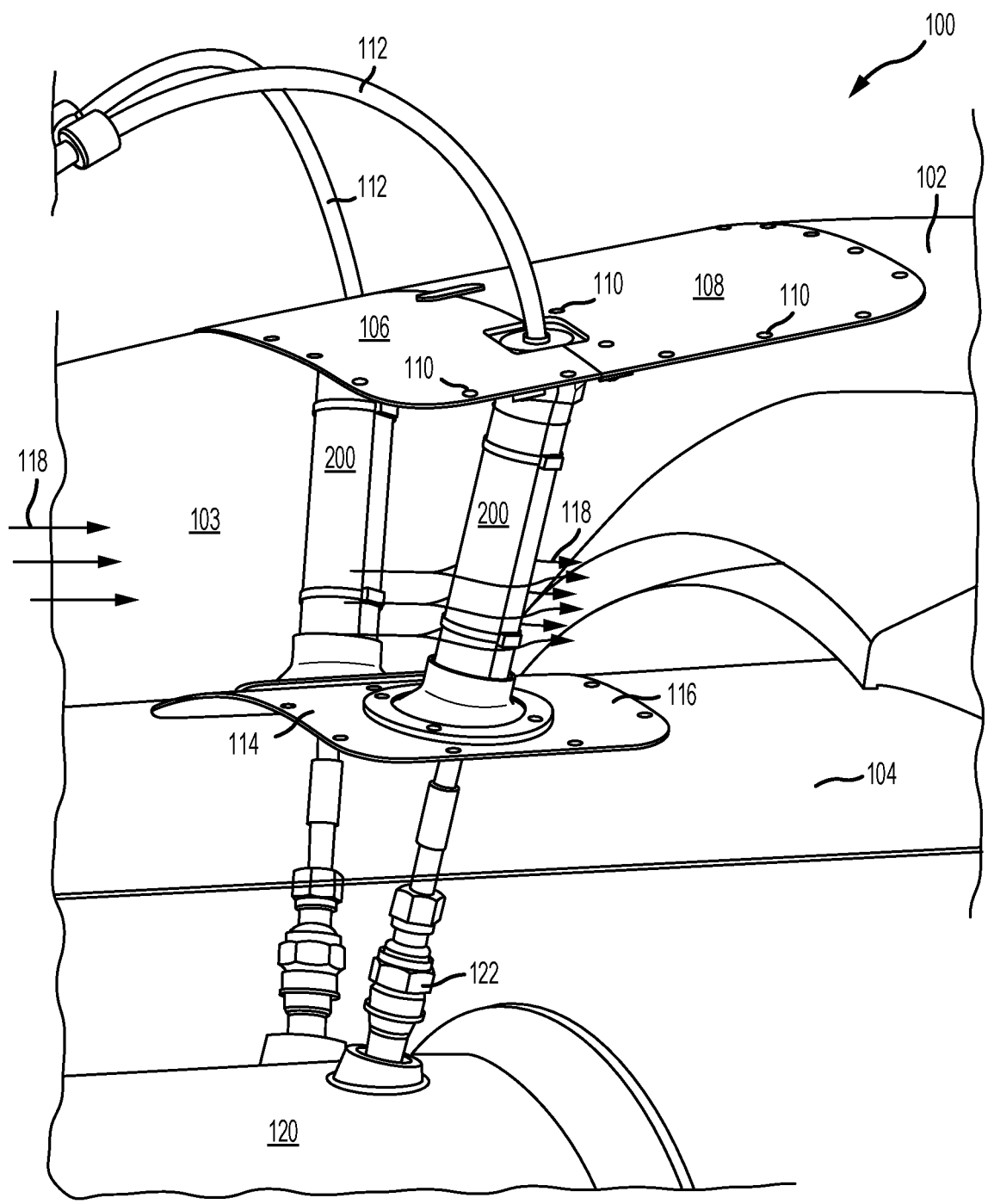
FIG. 1B illustrates a bypass flow duct having a cable conduit, in accordance with various embodiments.
Figure 2:
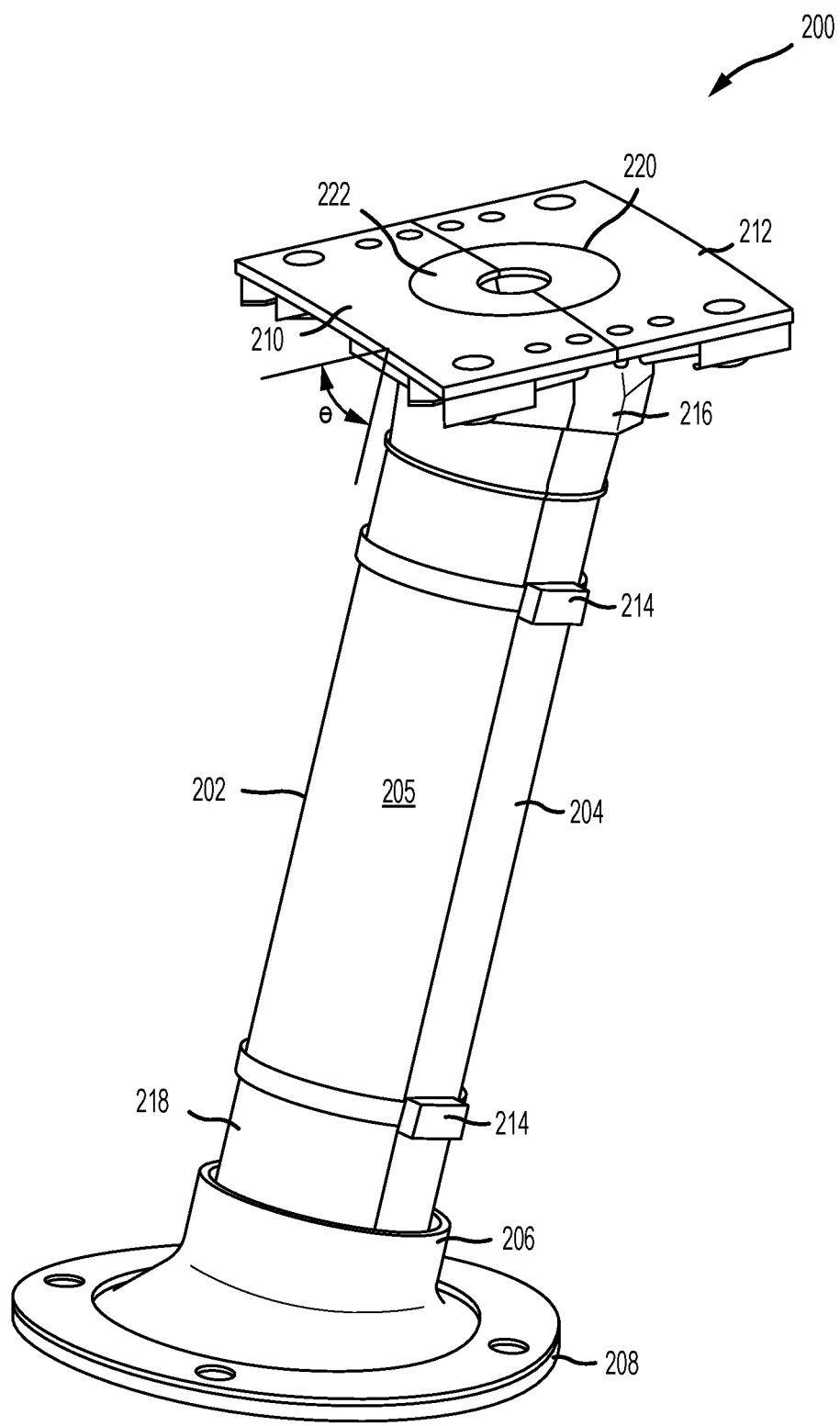
FIG. 2 illustrates a cable conduit, in accordance with various embodiments.
Figure 3A:
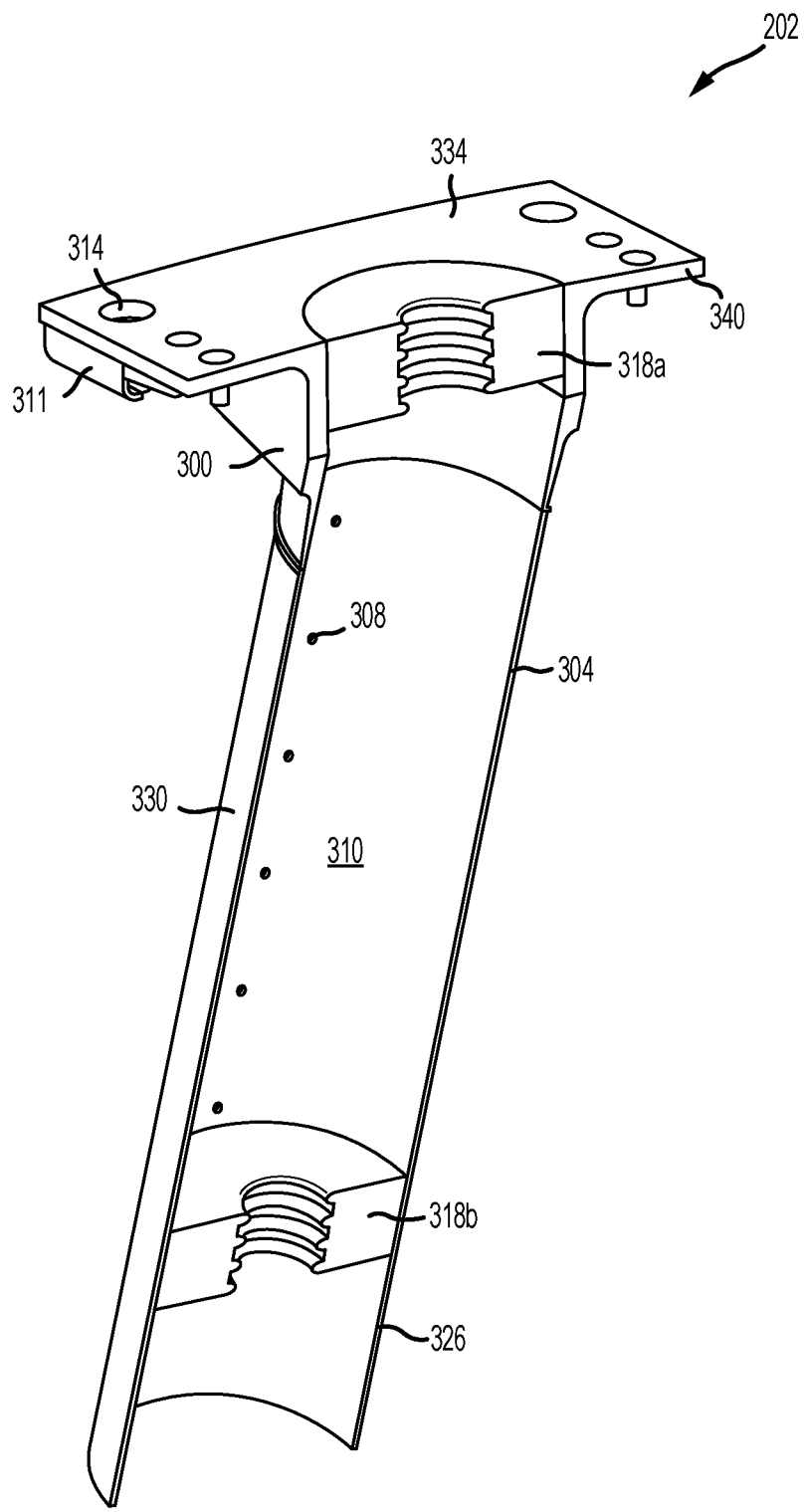
FIG. 3A illustrates a forward section of a cable conduit, in accordance with various embodiments.
Figure 3B:
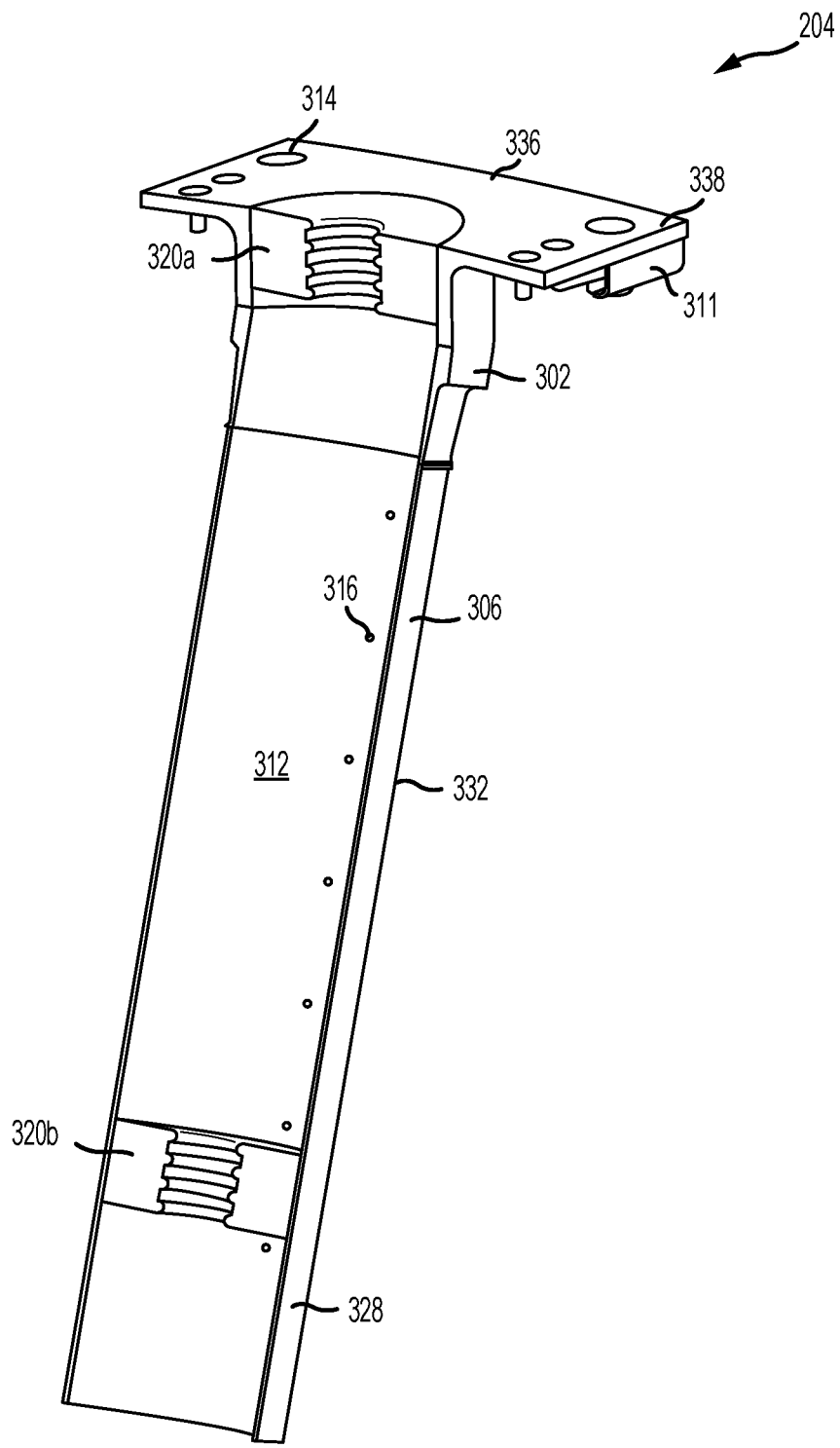
FIG. 3B illustrates an aft section of a cable conduit, in accordance with various embodiments.

According to various embodiments and with reference to FIGS. 1A and 1B, a combustor section 100 having a bypass flow duct 103 is provided. Bypass flow duct 103 is formed between an outer surface of combustor case 104 and an inner surface of outer case 102. In various embodiments, one or more cable conduits 200 are disposed within bypass flow duct 103 between the combustor case 104 and the outer case 102. In various embodiments, a forward outer case cover 106 and an aft outer case cover 108 may comprise a portion of outer case 102 and may be coupled to outer case 102 by fasteners 110. In a like manner, a forward combustor case cover 114 and an aft combustor case cover 116 may comprise a portion of combustor case 104 and be coupled to combustor case 104 by fasteners. In various embodiments and with brief reference to FIG. 2, cable conduit 200 may be coupled to the forward outer case cover 106 and the aft outer case cover 108 at a head end 216 and may be coupled to forward combustor case cover 114 and aft combustor case cover 116 at a foot end 218 opposite the head end. In various embodiments, cables such as, for example, igniter cables 112 pass through outer case 102 and combustor case 104 via an interior volume of cable conduits 200 and are coupled at igniter coupling 122 to combustor 120. In various embodiments, a fan section, such as fan section 22, drives bypass flow 118 through bypass flow duct 103. In various embodiments, when bypass flow 118 encounters a forward face of cable conduit 200, bypass flow 118 tends to be divided and separate around cable conduit 200 tending thereby to shed vorticies and generate turbulence as the flow streamlines travel forward to aft along the surface of the cable conduit. In various embodiments, and as illustrated in FIGS. 2, 3A, and 3B, a portion of bypass flow 118, may pass through a perforation 308 of a forward section 202 of a sleeve 205 into an interior volume of the sleeve defined by the interior volume 310 of the forward section 202 and the interior volume 312 of an aft sleeve 306. The portion of bypass flow 118 may exit the interior volume of the sleeve at a perforation 316 in the aft sleeve 306 tending thereby to reduce or inhibit the generation of turbulence and vorticies resulting from separation of the bypass flow 118 around cable conduit 200.

In various embodiments, and with additional reference to FIG. 2, a cable conduit 200 is provided. Cable conduit 200 has a head end 216 coupled to a sleeve 205 having a foot end 218 opposite the head end 216 and may be split axially into one or more sections such as a forward section 202 and an aft section 204. An outer case flange 210 having an upper surface 212 is coupled at head end 216 and a boot 206 having a flange 208 is coupled at the foot end 218. In various embodiments, outer case flange 210 is coupled at upper surface 212 to an outer case of a bypass flow duct and boot 206 is coupled at flange 208 to a combustor case. In various embodiments, sleeve 205 extends from head end 216 relatively beneath outer case flange 210 at an angle θ relative to upper surface 212 of outer case flange 210. In various embodiments, outer case flange 210 may have a cutout 220 penetrating into an interior of the cable conduit and filled with a split grommet 222 about an inner diameter of cutout 220. In various embodiments, forward section 202 and aft section 204 may be coupled by one or more straps 214. In various embodiments, a sleeve such as sleeve 205 may comprise one of a circular cross section, an elliptical or oblate cross section, an angular cross section, a teardrop or airfoil cross section, or any other cross section tending to minimize aerodynamic disturbance and/or pressure loss in a bypass flow. In various embodiments, angle θ may be between 90° and 45°, or may be between 80° and 55°, or may be between 70° and 65°.

In various embodiments, and with additional reference to FIGS. 3A and 3B, a forward section 202 and an aft section 204 of a cable conduit 200 are provided. In various embodiments forward section 202 may comprise a forward cap 300 having forward flange 340 comprising mounting features 314 which may comprise nut plates 311. In various embodiments, forward cap 300 may be coupled to a forward sleeve 304 defining an interior volume 310. In various embodiments, forward sleeve 304 may have a forward aerodynamic surface 330 comprising perforations 308 through the forward aerodynamic surface 330 and in fluid communication with interior volume 310. Forward section 202 may further comprise upper forward half grommet 318a proximate forward flange 340 and lower forward half grommet 318b proximate distal end 326 of forward sleeve 304. In various embodiments, a forward half grommet, such as upper forward half grommet 318a or lower forward half grommet 318b, may comprise a forward half of a split grommet such as split grommet 222. In various embodiments, an upper surface of upper forward half grommet 318a is substantially in plane with upper surface 334 of forward flange 340.

In a like manner, aft section 204 may comprise an aft cap 302 having an aft flange 338 comprising mounting features 314 which may comprise nut plates 311. In various embodiments, aft cap 302 may be coupled to an aft sleeve 306 defining an interior volume 312. In various embodiments, aft sleeve 306 may have an aft aerodynamic surface 332 comprising perforations 316 through the aft aerodynamic surface 332 and in fluid communication with interior volume 312. Aft section 204 may further comprise upper aft half grommet 320a proximate aft flange 338 and lower aft half grommet 320b proximate distal end 328 of aft sleeve 306. In various embodiments, an aft half grommet, such as upper aft half grommet 320a or lower aft half grommet 320b, may comprise an aft half of a split grommet such as split grommet 222. In various embodiments, an upper surface of upper aft half grommet 320a is substantially in plane with upper surface 336 of aft flange 338.

In various embodiments, a perforation such as perforation 308 or perforation 316 may comprise a hole not more than one eighth of an inch (⅛") in diameter. In various embodiments, a perforation may comprise a slot, a channel, a hole, or any other suitable geometry. In various embodiments, a sleeve such as forward sleeve 304 or aft sleeve 306 may comprise one of steel, a stainless steel, or a titanium, or an alloy.

Figure 4:
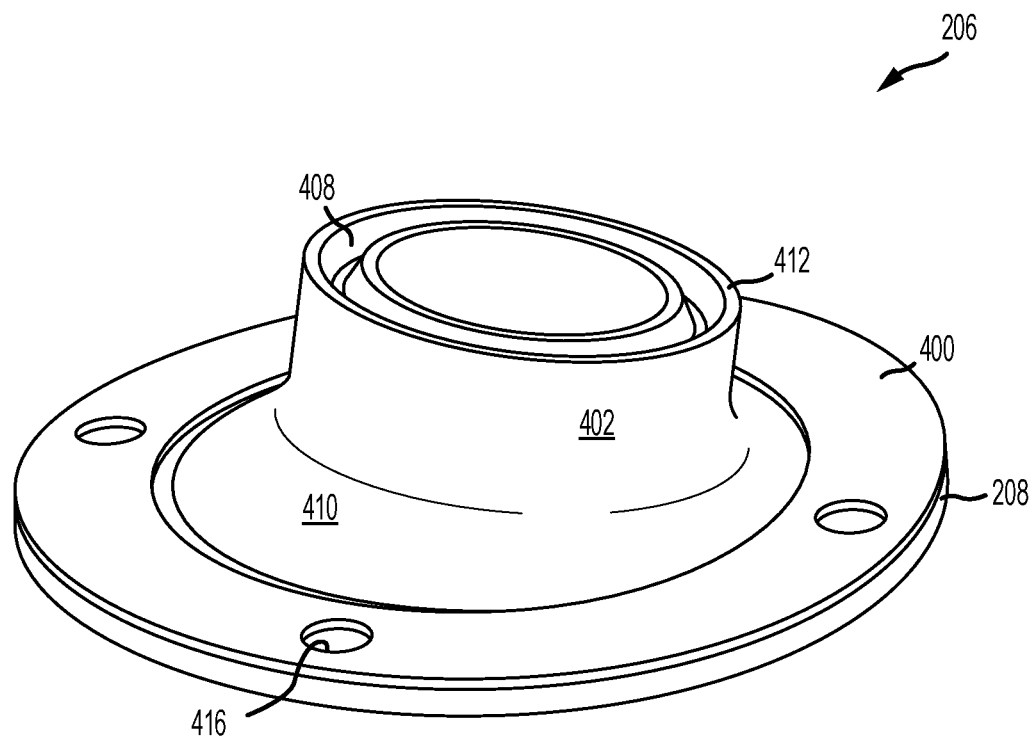
FIG. 4 illustrates a boot of a cable conduit, in accordance with various embodiments.
Figure 4:
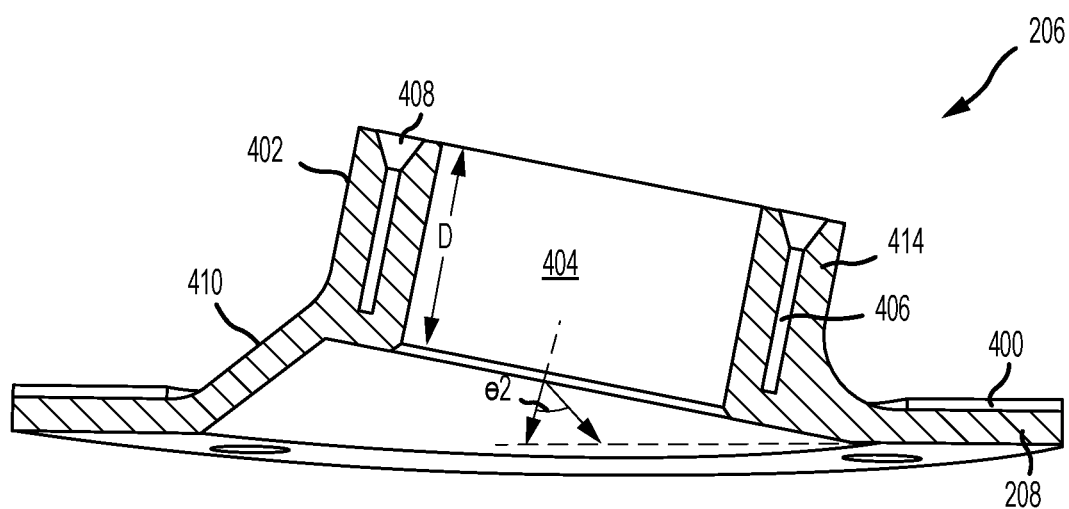

With additional reference to FIG. 4, a boot 206 of a cable conduit 200 is provided. Boot 206 comprises a flange 208 and a flange washer 400 having mounting features 416. An extrusion 402 defining an interior volume 404 of boot 206 extends relatively upward of flange 208 at an angle $\theta_2$ relative to a plane defined by flange 208 and relatively alternate to $\theta_1$. In various embodiments, extrusion 402 may comprise a gusset 410 and a circumferential channel 406 having a depth D beneath upper surface 412 of extrusion 402 into body material 414 of boot 206. In various embodiments, circumferential channel 406 may open at mouth 408 which may comprise chamfer or fillet feature. In various embodiments, depth D may be between one eighth of an inch (⅛") [3.075 mm] and four inches (4") [101.6 mm], or may be between one inch (1") [25.4 mm] and three and one half inches (3.5") [88.9 mm], or may be between two inches (2") [50.8 mm] and three inches (3") [76.2 mm]. In various embodiments, a boot may comprise at least one of a rubber, a synthetic rubber, a silicone rubber, or a plastic.

In various embodiments, a circumferential channel such as circumferential channel 406 may have a width substantially equal to a thickness of a sleeve such as, for example, sleeve 205, forward sleeve 304, or aft sleeve 306. In various embodiments, outer case flange 210 is coupled at upper surface 212 to an outer case of a bypass flow duct and boot 206 is coupled at flange 208 to a combustor case with distal end 326 of forward sleeve 304 and distal end 328 of aft sleeve 306 disposed within circumferential channel 406. In various embodiments, boot 206 tends to allow forward section 202 and aft section 204 to translate, relative to the plane defined by flange 208, along the x-axis, the y-axis, and the z-axis. In this regard, boot 206 tends to allow cable conduit 200 to be undisturbed by differential thermal growth between outer case 102 and combustor case 104.

Figure 5:
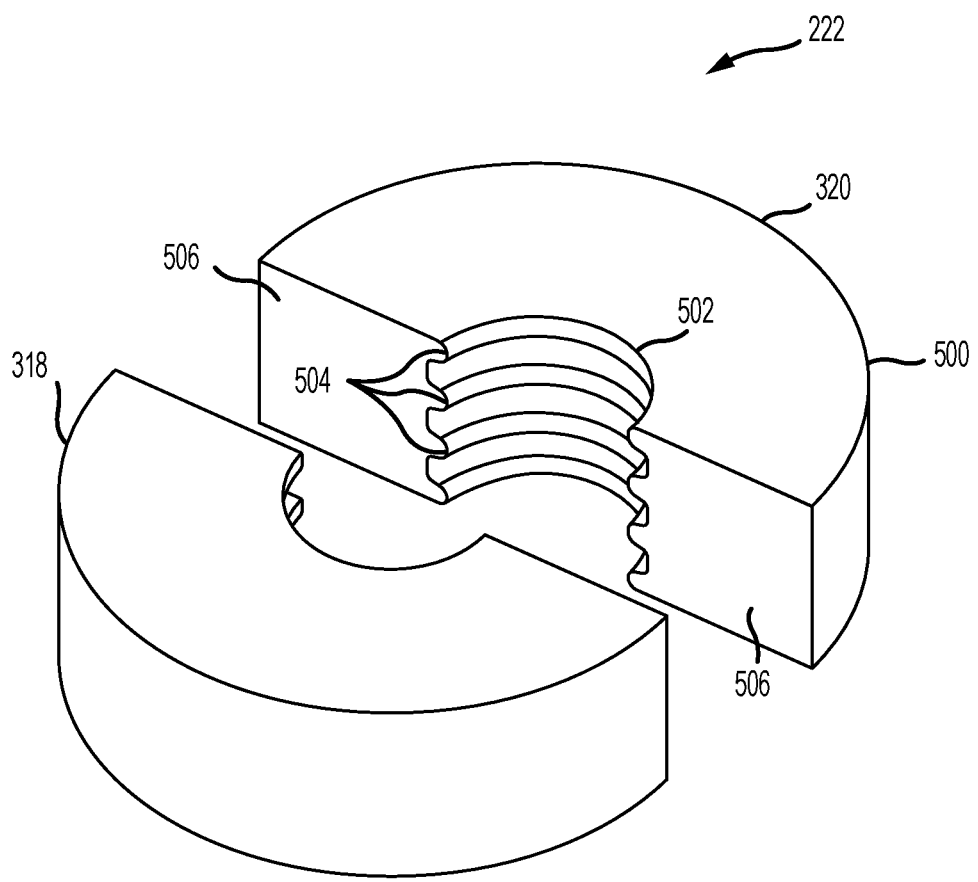
FIG. 5 illustrates a split grommet of a cable conduit, in accordance with various embodiments.

With reference now to FIG. 5 and with additional reference to FIGS. 2, 3A, and 3B, a split grommet 222 is provided comprising forward half grommet 318 and aft half grommet 320. In various embodiments, forward half grommet 318 and aft half grommet 320 comprise an outer diameter 500, an inner diameter 502, and a mating surface 506. In various embodiments, inner diameter 502 further comprises a plurality of ribs 504 extending radially inward of the inner diameter 502. In various embodiments, aft half grommet 320 may be coupled at outer diameter 500 to an aft cap or an aft sleeve such as, for example, aft cap 302 or aft sleeve 306 and, forward half grommet 318 may be coupled in a like manner to a forward cap or a forward sleeve such as, for example, forward cap 300 and forward sleeve 304. In various embodiments, a split grommet such as split grommet 222 may comprise at least one of a rubber, a synthetic rubber, a silicone rubber, or a plastic.

Figure 6:
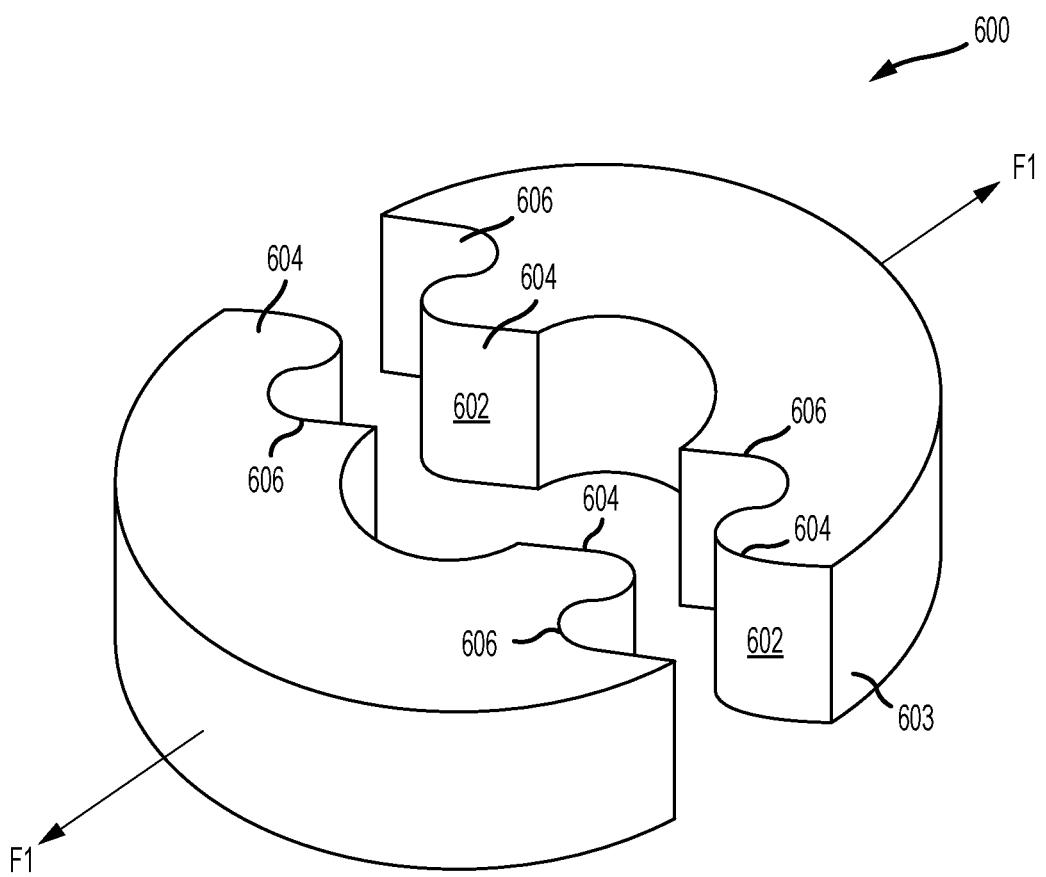
FIG. 6 illustrates a split grommet of a cable conduit, in accordance with various embodiments.

In various embodiments, and with additional reference to FIG. 6, a split grommet 600 is provided. Split grommet 600 comprises features, geometries, construction, manufacturing techniques, and/or internal components similar to split grommet 222 but with varied arrangement of mating surfaces. Mating surfaces 602 comprises a compound curve 603 defining a series of fingers 604 and pockets 606. When mating surfaces 602 are disposed proximate each other, fingers 604 tend to interlock with pockets 606 and, in response, tending to generate an interference along mating surfaces 602 thereby coupling the forward and aft half of split grommet 600. In various embodiments, the interference along mating surfaces 602 tends to resist radial pull force $F_1$.

Figure 7:
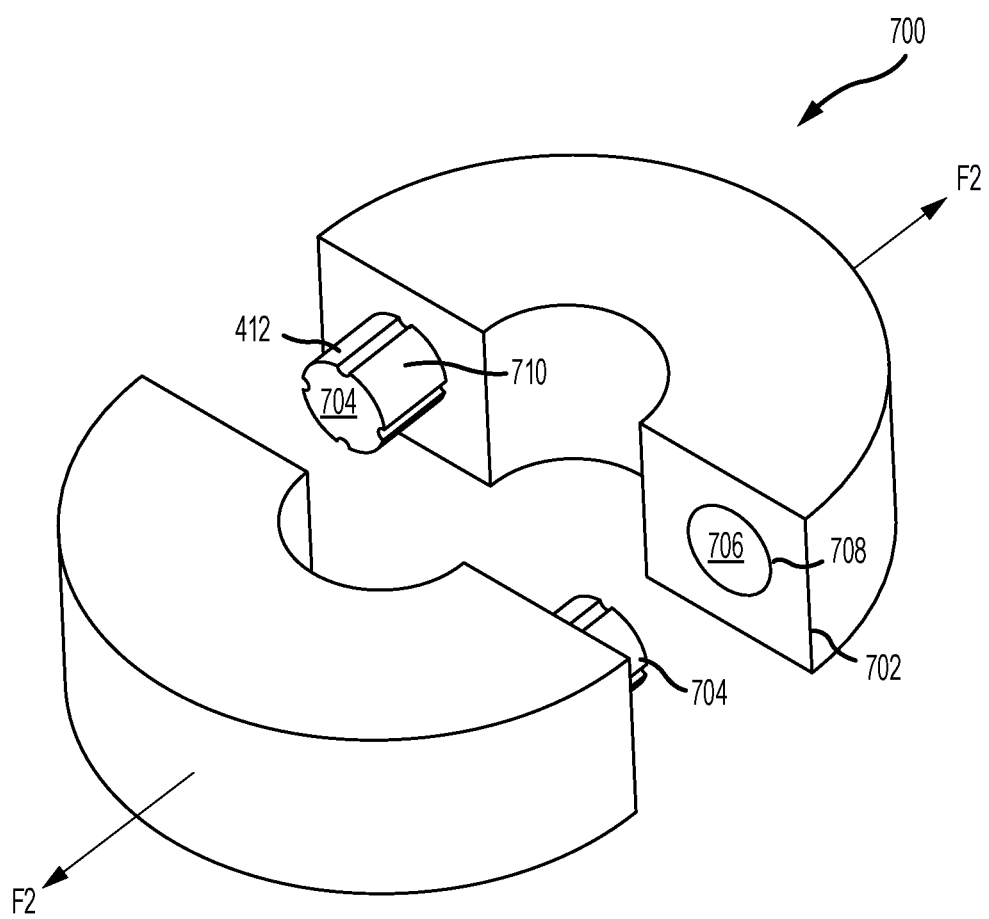
FIG. 7 illustrates a split grommet of a cable conduit, in accordance with various embodiments.

In various embodiments, and with additional reference to FIG. 7, a split grommet 700 is provided. Split grommet 700 comprises features, geometries, construction, manufacturing techniques, and/or internal components similar to split grommets 222 and 600 but with varied arrangement of mating surfaces. Mating surfaces 702 comprise cylindrical extrusions 704 and corresponding cavities 706 comprising bores 708 opposite extrusions 704. Extrusions 704 comprise axial trenches 712 defining interference surfaces 710. When mating surfaces 702 are disposed proximate each other, extrusions 704 are disposed within cavities 706 and, in response, tending to generate an interference between interference surfaces 710 and bores 708 in response thereby coupling the forward and aft half of split grommet 700. In various embodiments, the interference between interference surfaces 710 and bores 708 tends to resist radial pull force $F_2$.

Figure 8:
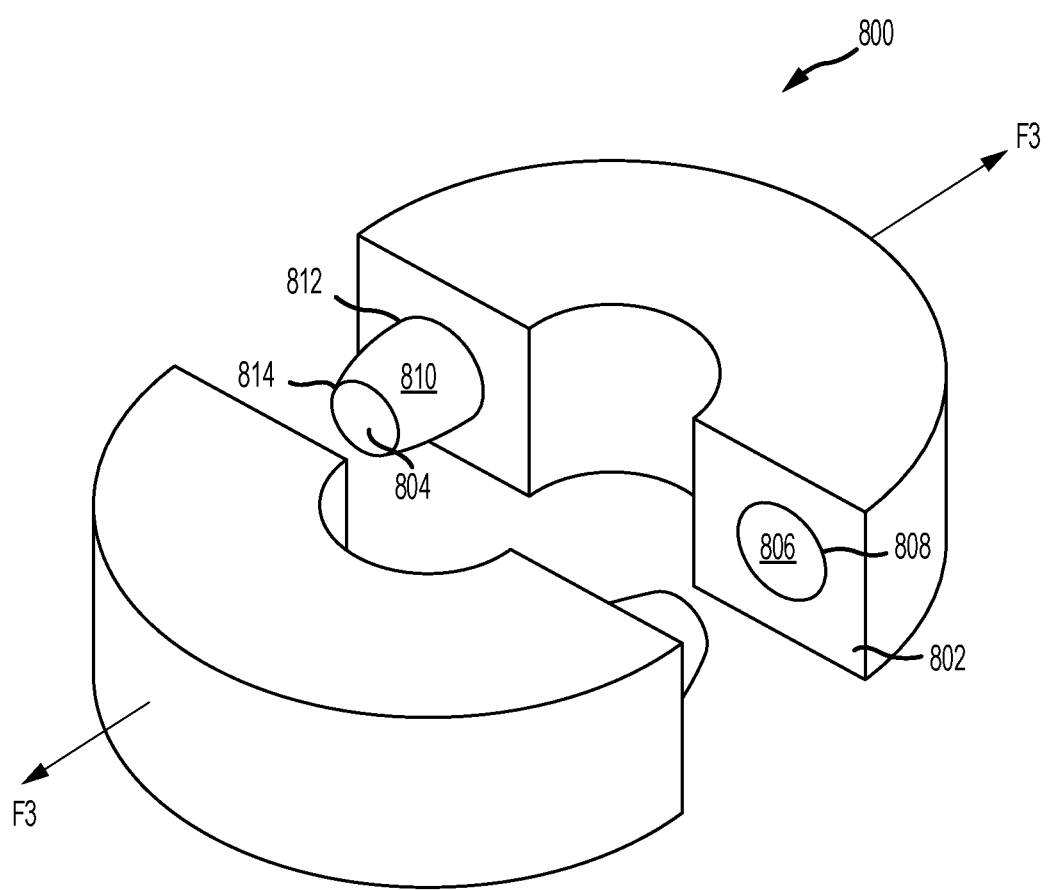
FIG. 8 illustrates a split grommet of a cable conduit, in accordance with various embodiments.

In various embodiments, and with additional reference to FIG. 8, a split grommet 800 is provided. Split grommet 800 comprises features, geometries, construction, manufacturing techniques, and/or internal components similar to split grommets 222, 600, and 700 but with varied arrangement of mating surfaces. Mating surfaces 802 comprise tapered extrusions 804 and corresponding cavities 806 comprising bores 808 opposite tapered extrusions 804. Tapered extrusions 804 comprise interference surfaces 810 which taper from base 812 having a diameter greater than a diameter of bore 808 to tip 814 having a diameter less than the diameter of bore 808. When mating surfaces 802 are disposed proximate each other, tapered extrusions 804 are disposed within cavities 806 and, in response, tending to generate an interference between interference surfaces 810 and bores 808 along a portion of interference surfaces 810 where the diameter is greater than the diameter of the bores 808 thereby coupling the forward and aft half of split grommet 800. In various embodiments, the interference between the portion of interference surfaces 810 and bores 808 tends to resist radial pull force $F_3$.

Figure 9:
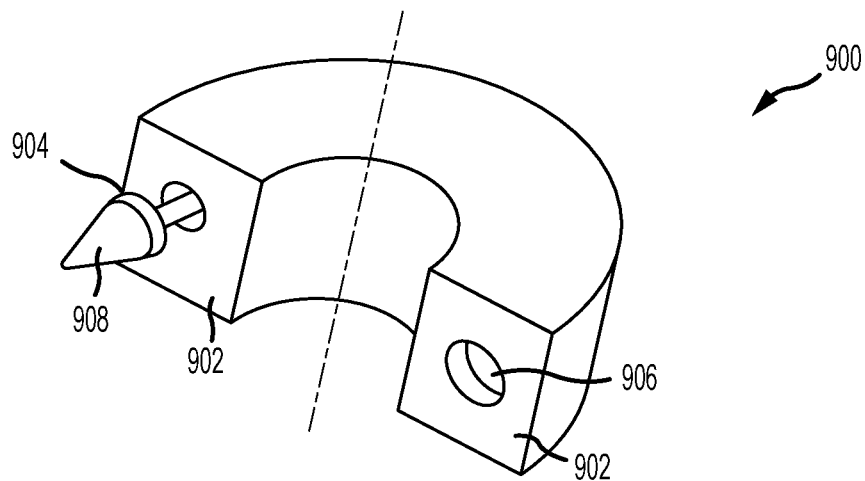
FIG. 9 illustrates a split grommet of a cable conduit, in accordance with various embodiments.
Figure 9:
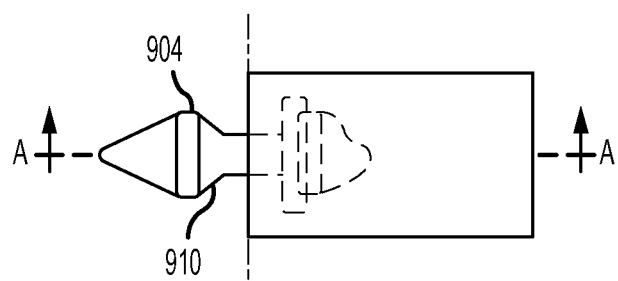
Figure 9:
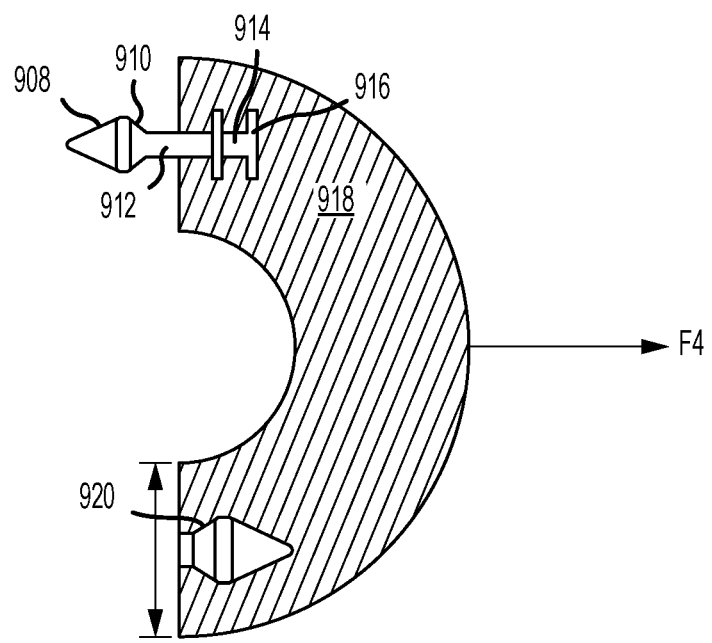

In various embodiments, and with additional reference to FIG. 9, a split grommet 900 is provided. Split grommet 900 comprises features, geometries, construction, manufacturing techniques, and/or internal components similar to split grommets 222, 600, 700, and 800 but further comprises embedded studs 904 protruding perpendicular to mating surfaces 902. Embedded stud 904 comprises a conical head end 908 having a distal taper 910 at the base of the head toward a shank 912 extending from base. Shank 912 comprises a foot end 914 embedded in body material 918 and having one or more flanges 916 about the shank opposite conical head end 908. Mating surfaces 902 comprise corresponding cavities 906, opposite embedded studs 904, defined by an outer mold line of conical head end 908 and comprising backwalls 920. When mating surfaces 902 are disposed proximate each other, embedded studs 904 are disposed within cavities 906 and, in response, tending to generate an interference between distal taper 910 and backwalls 920 thereby coupling the forward and aft half of split grommet 900. In various embodiments, the interference between the distal taper 910 and backwalls 920 tends to resist radial pull force $F_4$.

Figure 10:
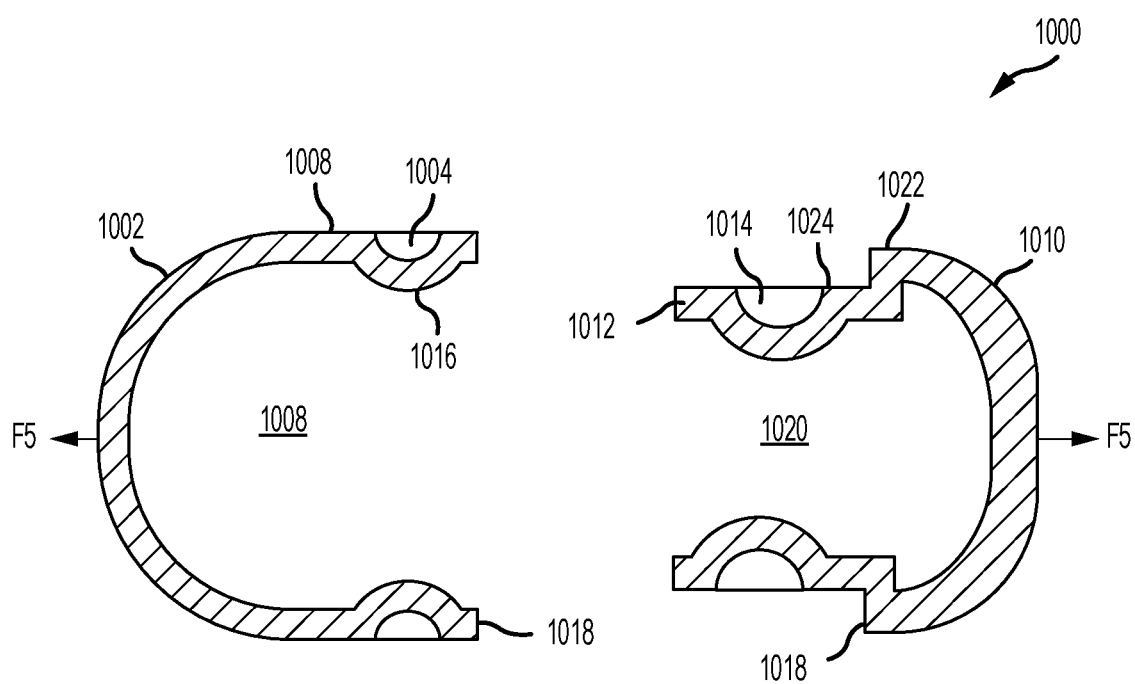
FIG. 10 illustrates a sleeve of a cable conduit, in accordance with various embodiments.

In various embodiments and with reference now to FIG. 10, a cross section of a sleeve 1000 is shown. Sleeve 1000 comprises features, geometries, construction, manufacturing techniques, and/or internal components similar to sleeve 205 of FIG. 2 but further comprises sleeve locking features. Forward sleeve 1002 comprises dimples 1004 in proximate mating surface 1018 in forward aerodynamic surface 1006 located proximate mating surface 1018. Inner surface 1016 of dimple 1004 protrudes radially inward of forward aerodynamic surface 1006 into interior volume 1008. Aft sleeve 1010 comprises a recessed portion 1012 set a distance relatively inward from aft aerodynamic surface 1022. In various embodiments, the inward distance of the recessed portion tends to equal the thickness of the forward sleeve 1002. Recessed portion 1012 comprises cups 1014 protruding into interior volume 1020 having an inner surface 1024 with a curvature tending to define a volume fitted to inner surface 1016 of dimples 1004. When mating surfaces 1018 are disposed proximate each other, inner surface 1016 of dimples 1004 tend to slide over recessed portions 1012 and drop into cups 1014 disposing, in response, inner surface 1016 proximate inner surface 1024 tending to generate an interference between inner surface 1016 and inner surface 1024 thereby coupling the forward sleeve 1002 to the aft sleeve 1010 and joining interior volumes 1008 and 1020. In various embodiments, the interference between inner surface 1016 and inner surface 1024 tends to resist radial pull force $F_5$.

Figure 11:
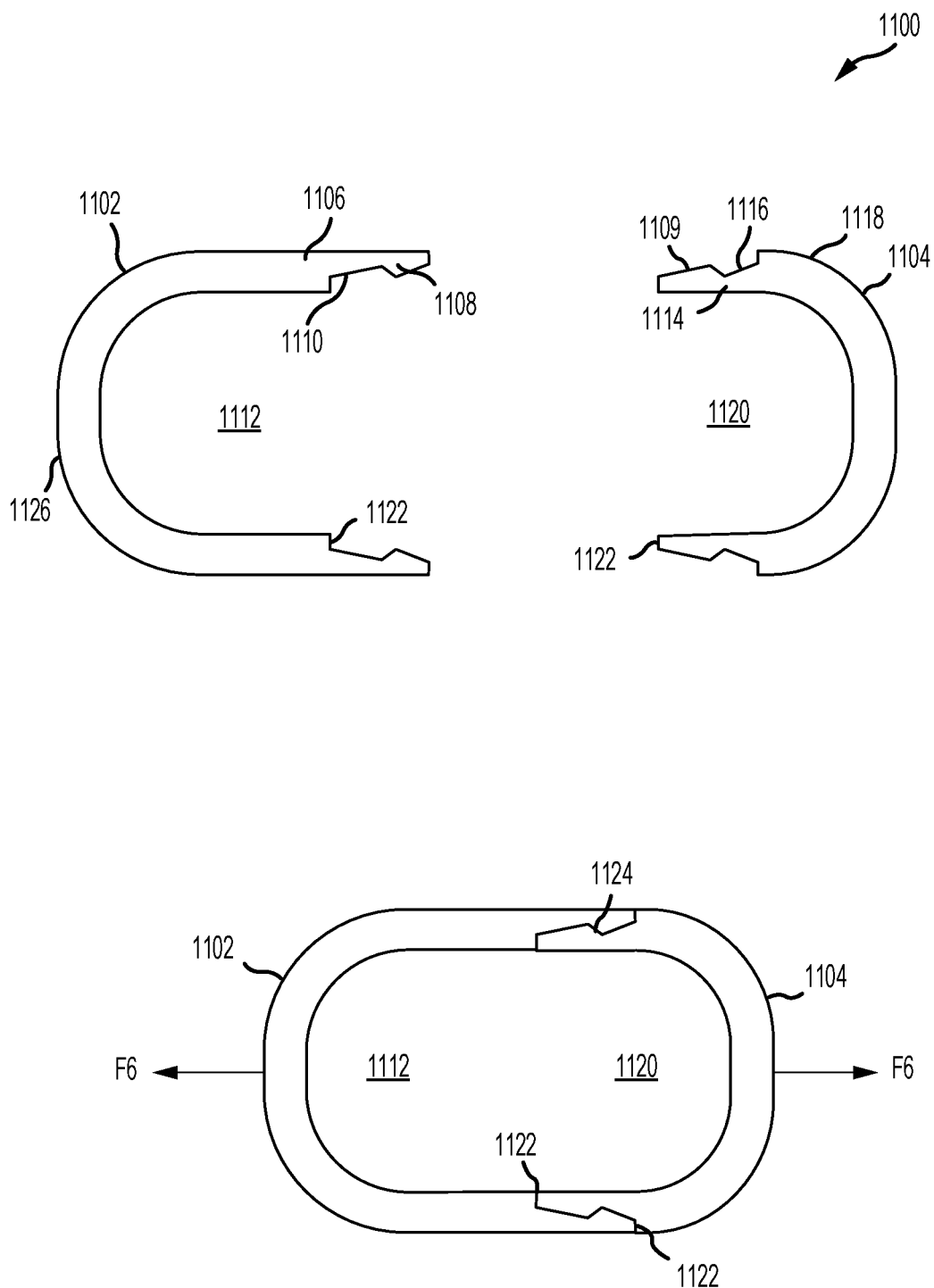
FIG. 11 illustrates a sleeve of a cable conduit, in accordance with various embodiments.

In various embodiments and with reference now to FIG. 11, a cross section of a sleeve 1100 is shown. Sleeve 1100 comprises features, geometries, construction, manufacturing techniques, and/or internal components similar to sleeve 205 of FIG. 2 but further comprises sleeve locking features. Forward sleeve 1102 comprises tabs 1108 facing radially inward of forward aerodynamic surface 1126 at ends 1106. Channels 1110 are cut radially outward of interior volume 1112 toward forward aerodynamic surface 1126 along an axis of forward sleeve 1102 relatively behind tabs 1108. Similarly, aft sleeve 1104 comprises tabs 1109 facing radially outward of interior volume 1120 at ends 1114. Channels 1116 are cut radially inward of aft aerodynamic surface 1118 toward interior volume 1120. When mating surfaces 1122 are disposed proximate one another, tabs 1108 and 1109 tend to slide over each other and, in response, drop into channels 1116 and 1110 tending to generate an interference 1124 thereby coupling the forward sleeve 1102 to the aft sleeve 1104 and joining interior volumes 1112 and 1120. In various embodiments, the interference 1124 tends to resist radial pull force $F_6$.

Figure 12A:
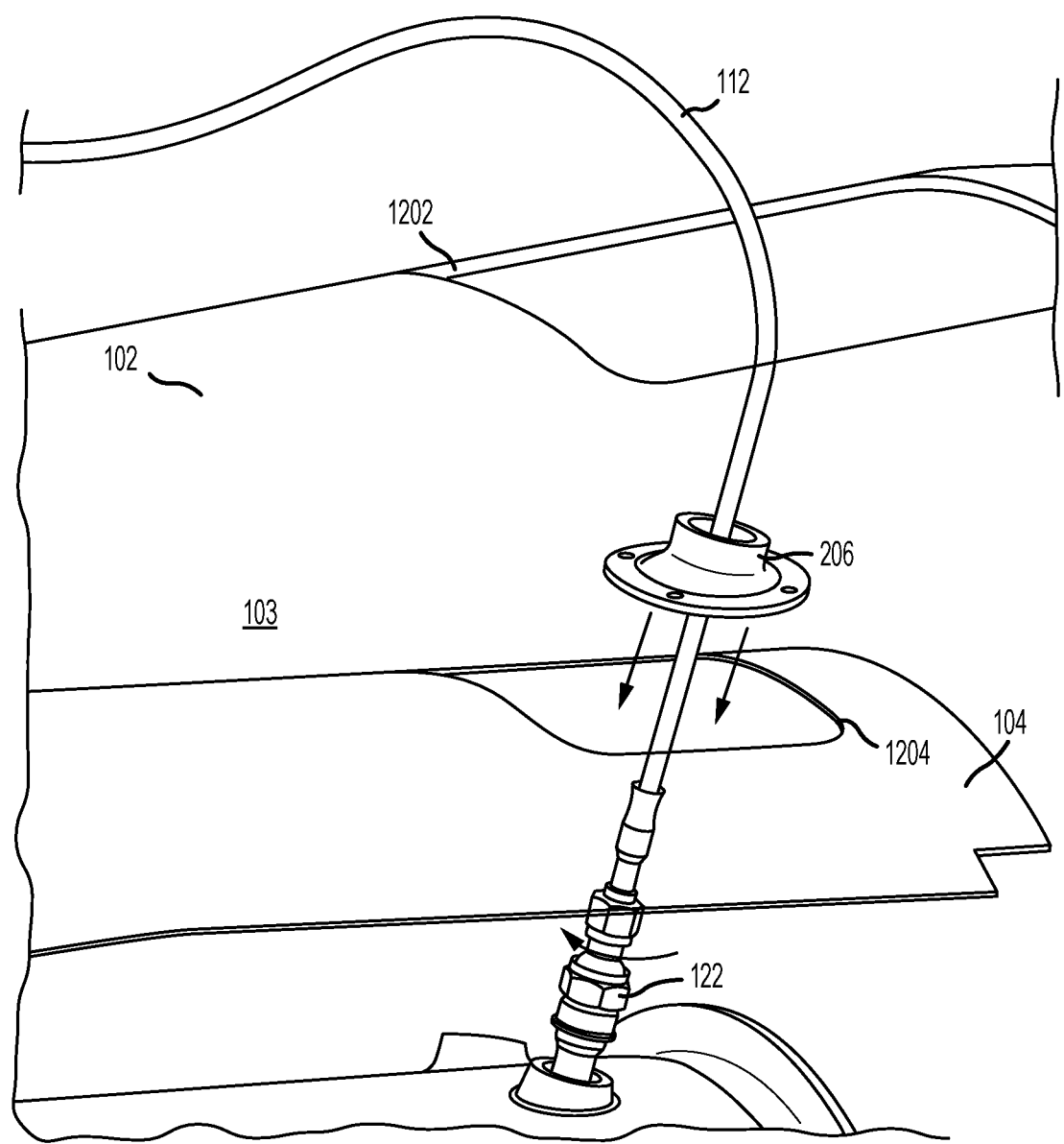
FIG. 12A illustrates a bypass flow duct having a cable conduit, in accordance with various embodiments.
Figure 12B:
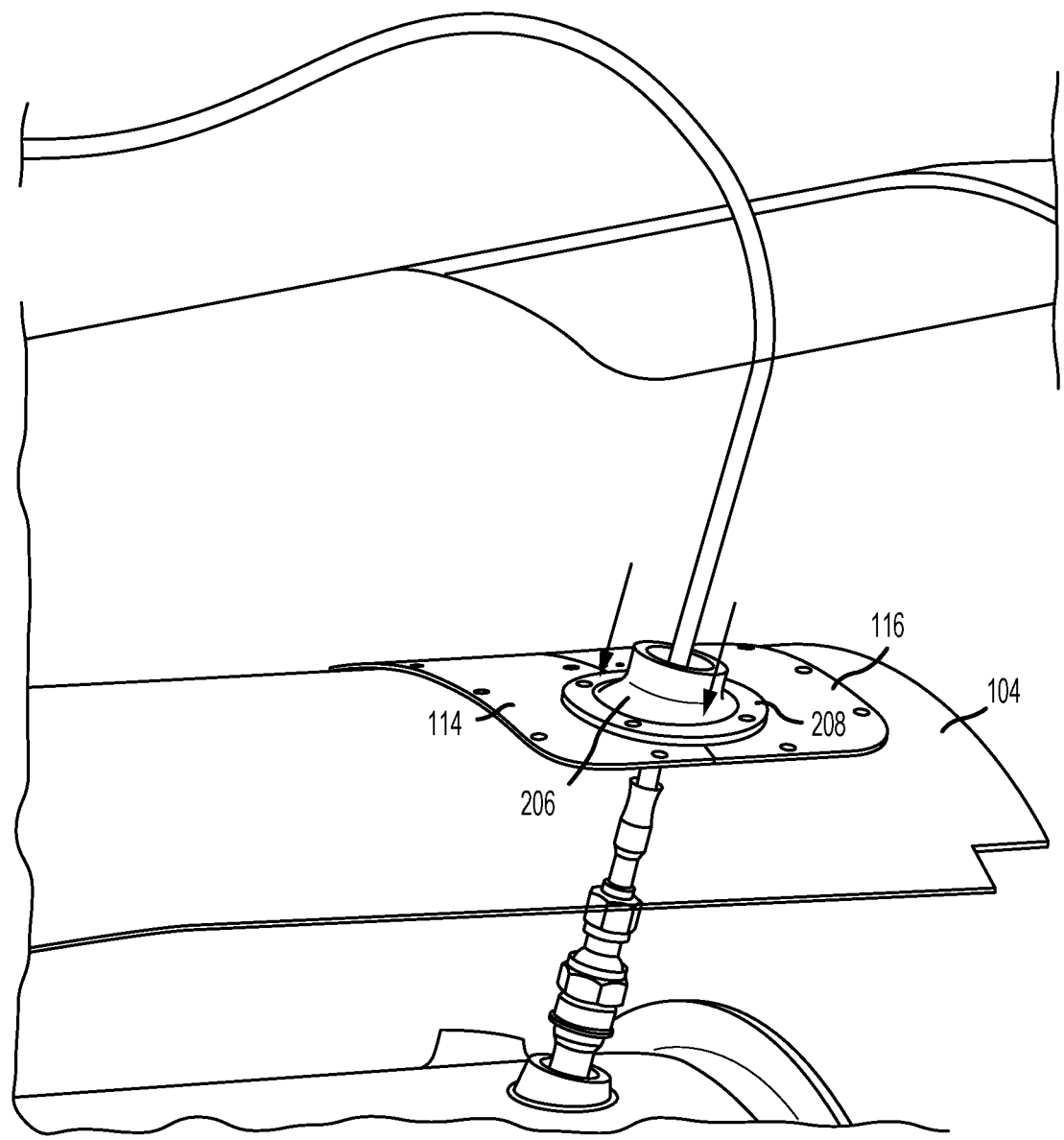
FIG. 12B illustrates a bypass flow duct having a cable conduit, in accordance with various embodiments.

In various embodiments and with reference now to FIGS. 12A through E and 13, a method 1300 of assembling a cable conduit is provided. In various embodiments, method 1300 comprises step 1302, as shown in FIG. 12A, of inserting igniter cable 112 through boot 206 and feeding igniter cable 112 through outer case access port 1202 and combustor case access port 1204 to igniter cable coupling 122. Igniter cable 112 is then coupled to igniter cable coupling 122 and boot 206 is passed down igniter cable 112 and disposed within bypass flow duct 103. In various embodiments, method 1300 comprises step 1304, as shown in FIG. 12B, of closing out combustor case access port 1204 with forward combustor case cover 114 and aft combustor case cover 116 by coupling forward combustor case cover 114 and aft combustor case cover 116 to combustor case 104. Boot 206 is contacted with the combustor case covers and mounting features 416 of flange washer 400 are aligned with corresponding features on the case covers before boot 206 is coupled to forward combustor case cover 114 and aft combustor case cover 116.

Figure 12C:
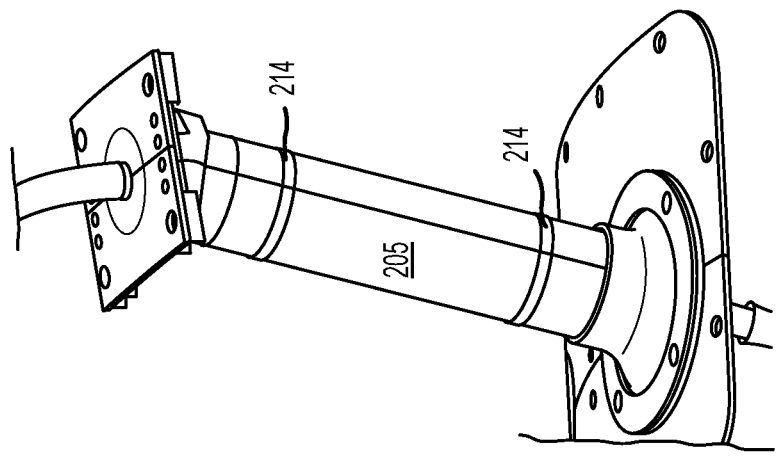
FIG. 12C illustrates a cable conduit configured to pass through a bypass flow duct, in accordance with various embodiments.
Figure 12C:
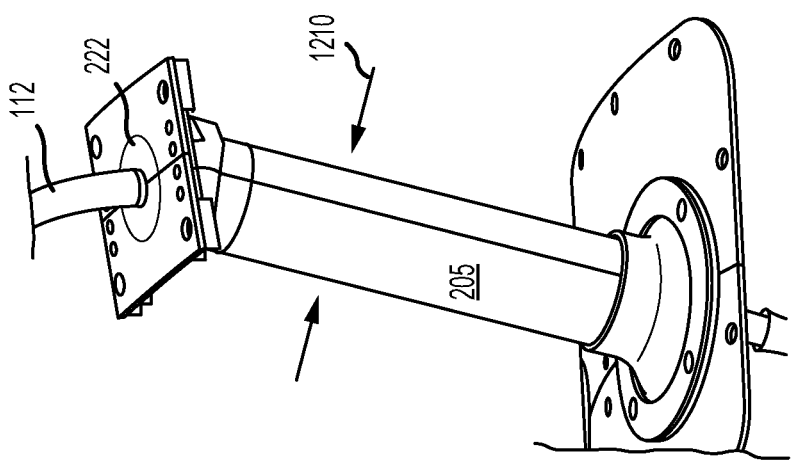
Figure 12C:
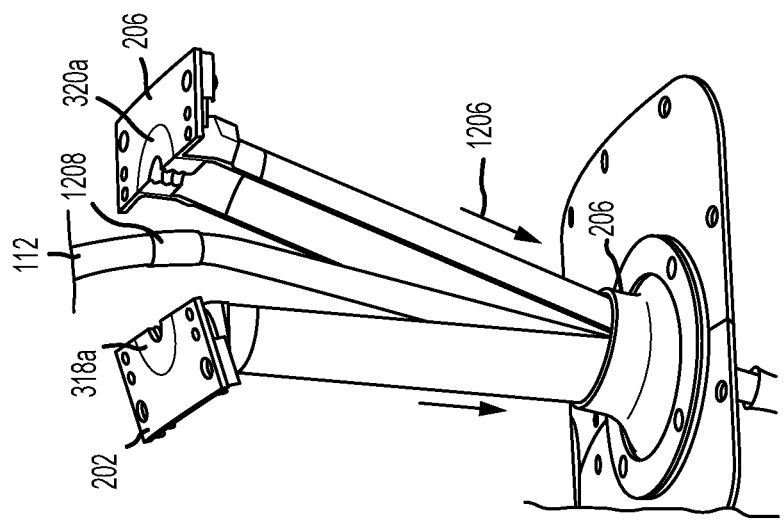
Figure 12D:
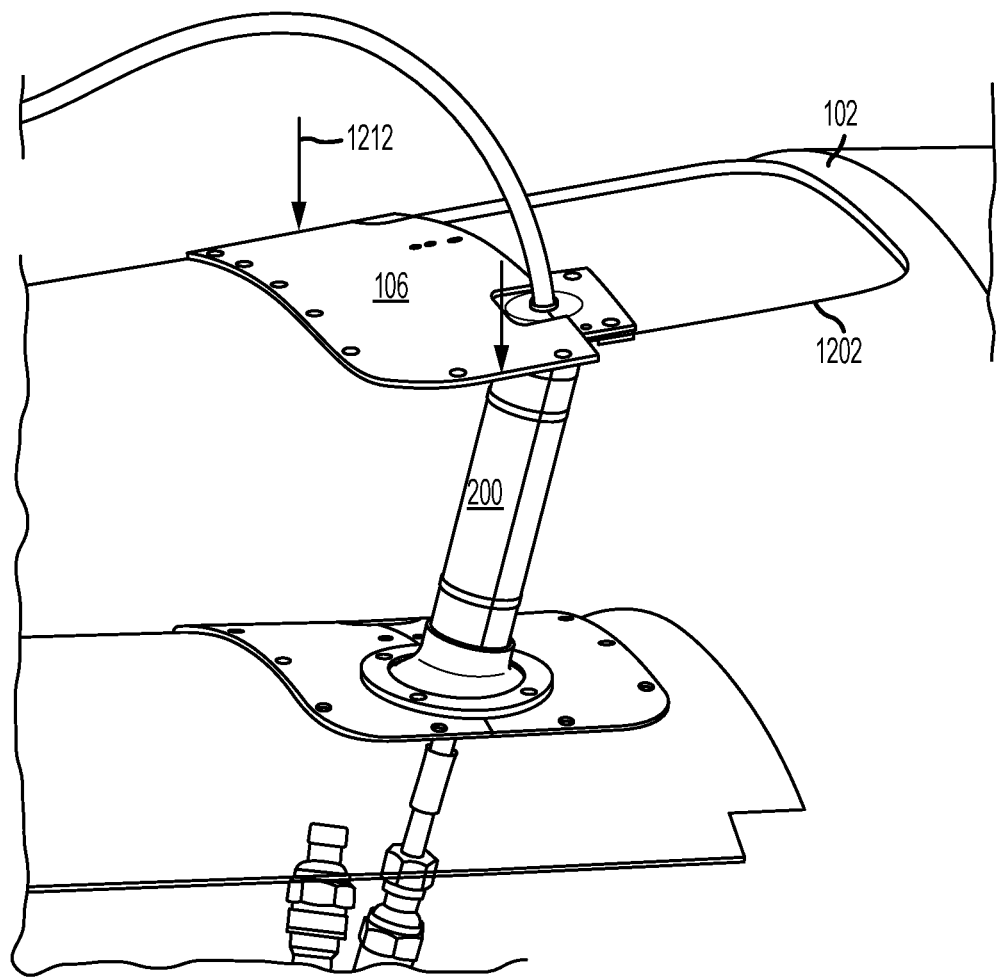
FIG. 12D illustrates a bypass flow duct having a cable conduit, in accordance with various embodiments.
Figure 12E:
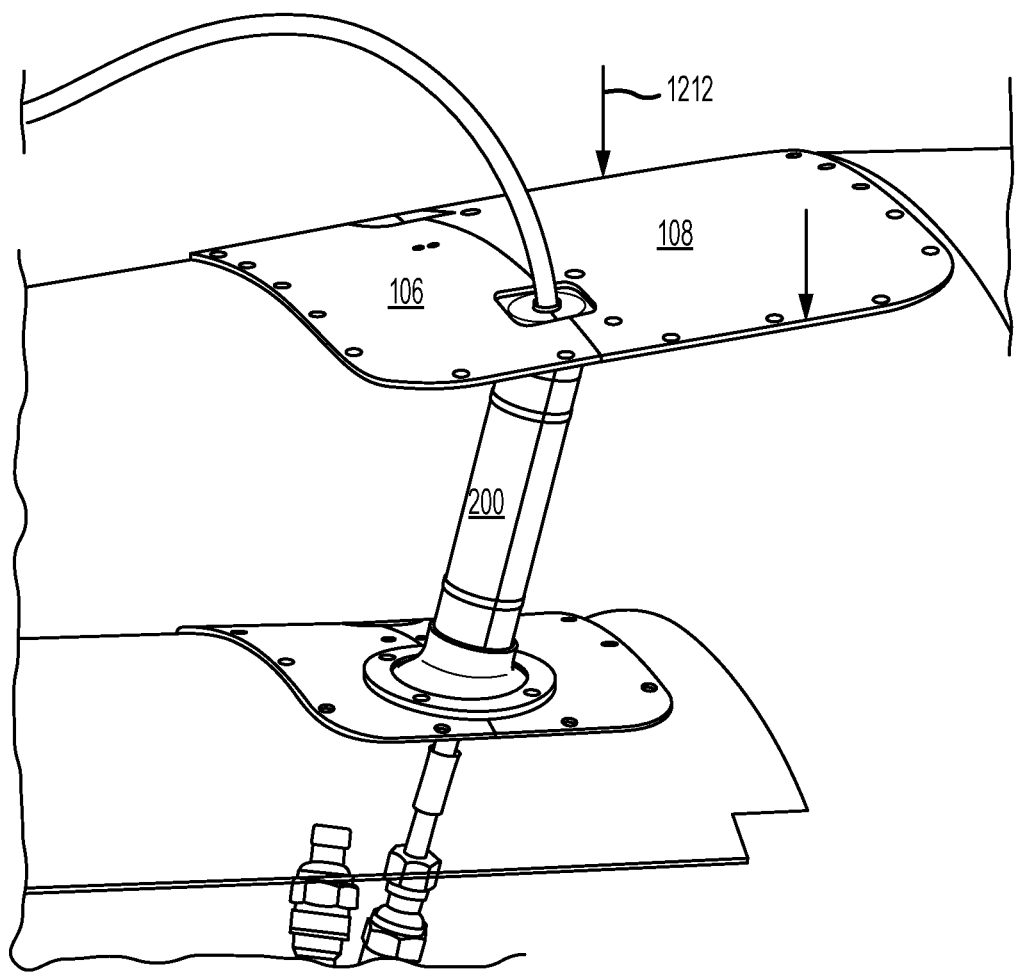
FIG. 12E illustrates a bypass flow duct having a cable conduit, in accordance with various embodiments.
Figure 13:
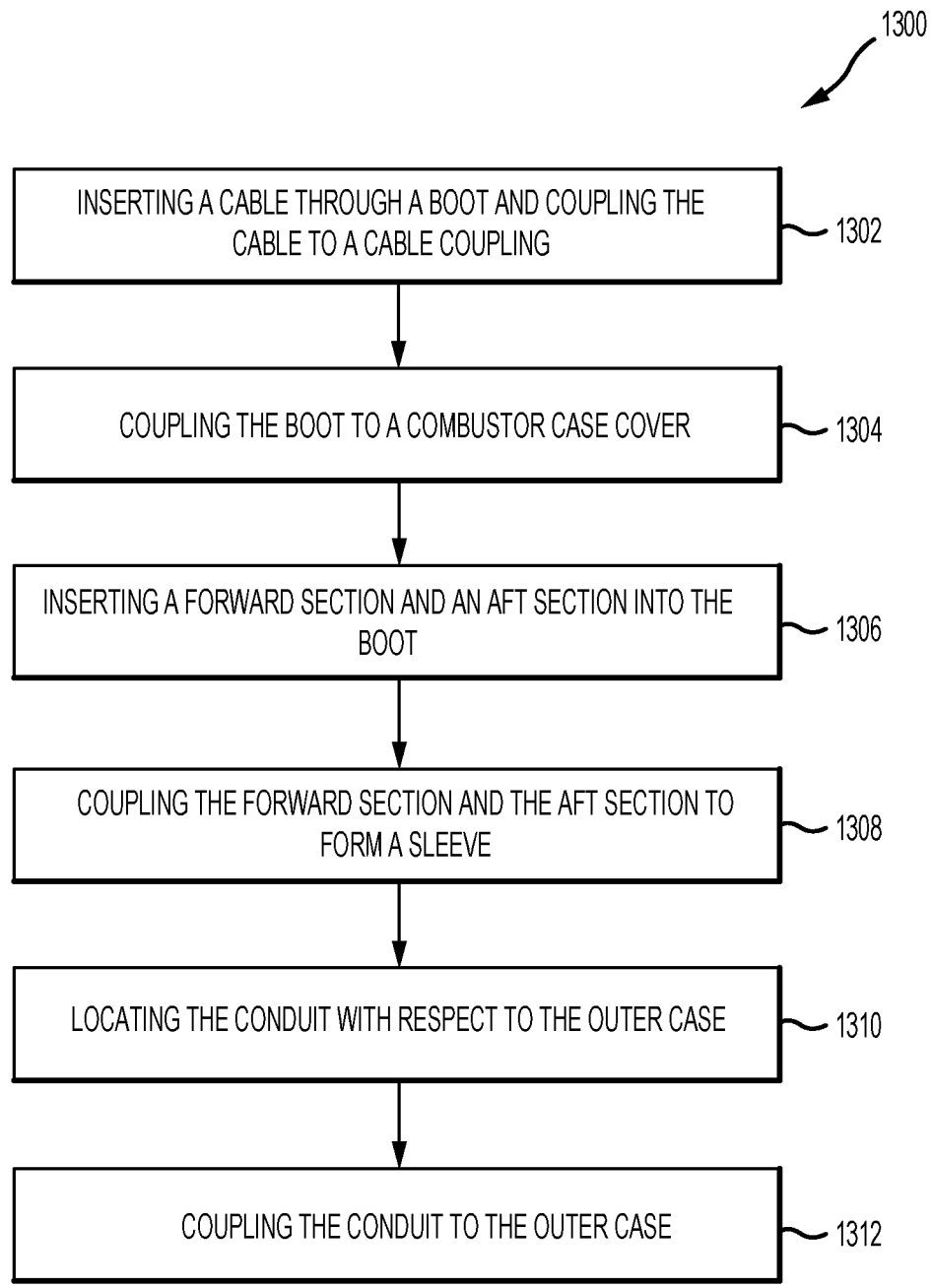
FIG. 13 illustrates a method of assembling a cable conduit, in accordance with various embodiments.

In various embodiments, method 1300 comprises steps as shown in FIG. 12C, of inserting (step 1306) a forward section 202 and an aft section 204 of a cable conduit into the mouth 408 of boot 206 and further inserting distal ends 328 and 326 downward into circumferential channel 406 as indicated by arrows 1206. In various embodiments, upper forward half grommet 318a and upper aft half grommet 320a of split grommet 222 may be aligned with a ferrule or collet 1208 tending to dispose a predetermined length of igniter cable 112 within sleeve 205 which is formed (step 1308) as forward section 202 and aft section 204 are brought into contact along the mating surfaces (referring to FIGS. 5 through 11) and coupled about the igniter cable 112 as shown by arrows 1210 to combine their interior volumes (referring to FIGS. 3A, 3B, 10, and 11, for example, interior volumes 310 and 312). In various embodiments, step 1308 may further comprise coupling straps 214 about the sleeve 205. In various embodiments and with additional reference to FIGS. 3A and 3B, method 1300 comprises steps as shown in FIGS. 12D and 12E, of locating the cable conduit (step 1310) with respect to the outer case 102 by coupling forward flange 340 at upper surface 334 to forward outer case cover 106 before securing the forward outer case cover 106 to outer case 102. After locating the cable conduit with respect to the outer case, outer case access port 1202 is closed by coupling forward outer case cover 106 and aft outer case cover 108 to outer case 102 as indicated by arrows 1212 thereby coupling (step 1312) the cable conduit to the outer case 102.

Figure 14:
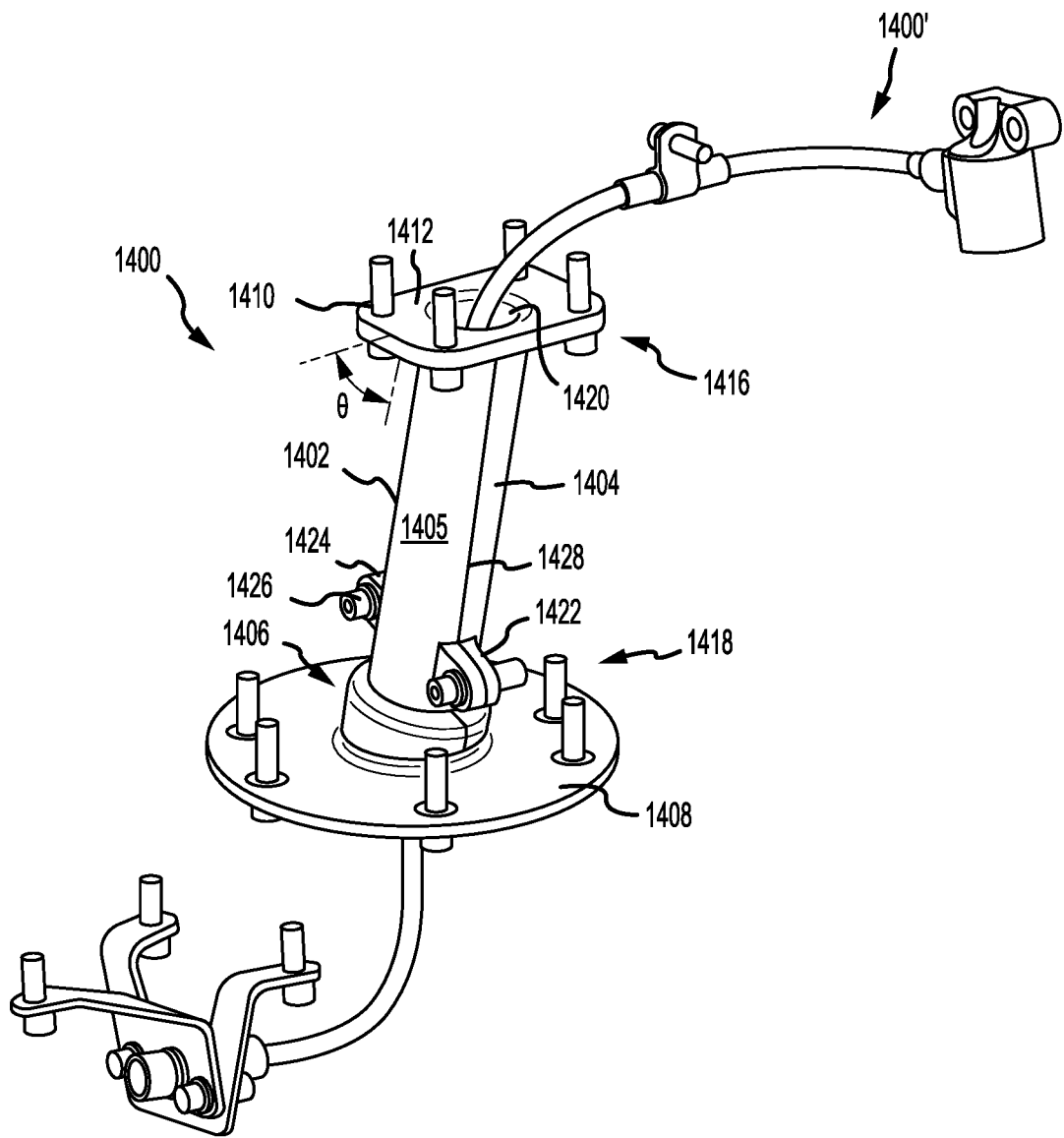
FIG. 14 illustrates a cable conduit configured to pass through a bypass flow duct, in accordance with various embodiments.

In various embodiments and with additional reference to FIG. 14, an assembly is illustrated including includes a cable conduit 1400 and a cable 1400'. A portion of the cable 1400' passes through the cable conduit 1400 and is thereby enclosed and relatively insulated protected from environmental effects. Cable conduit 1400 comprises features, geometries, construction, manufacturing techniques, and/or internal components similar to cable conduit 200. Cable conduit 1400 includes a head end 1416 coupled to a sleeve 1405. In various embodiments, the sleeve 1405 may comprise a plastic, thermoplastic, or thermoset material such as, for example, polyamide-imide. The sleeve 1405 extends to a foot end 1418 which is opposite of the head end 1416. Cable conduit 1400 may be split axially into one or more sections such as a forward section 1402 and an aft section 1404. An inner case flange 1410 (e.g., a first flange) having an upper surface 1412 is coupled at the head end 1416 and a boot 1406 comprising an outer case flange 1408 (e.g., a second flange) is coupled at the foot end 1418. In various embodiments, sleeve 1405 extends from head end 1416 relatively beneath first flange 1410 at an angle θ relative to upper surface 1412 of first flange 1410.

In various embodiments, the sleeve 1405 includes one or more coupling lobes such as a first coupling lobe 1422 and a second coupling lobe 1424 which protrude radially from the sleeve 1405. The coupling lobes (1422, 1424) may be each be configured to receive a fastener 1426. In various embodiments, the coupling lobes (1422, 1424) may be split in to respective halves (i.e. a forward half and an aft half) along the a separation plane 1428 between the forward section 1402 and the aft section 1404 of the sleeve 1405. In this regard, the coupling lobes (1422, 1424) may be configured to couple the forward section 1402 to the aft section 1404 along the separation plane 1428. In various embodiments, the coupling lobes (1422, 1424) may be disposed proximate the foot end 1418.

In various embodiments, first flange 1410 may have a cutout 1420 penetrating into an interior of the cable conduit. In various embodiments, a split grommet may be inserted within cutout 1420 about an inner diameter of cutout 1420. In various embodiments, the split grommet may fill the cutout 1420 or may recessed into the cutout 1420 below the upper surface 1412. In various embodiments, a sleeve such as sleeve 1405 may comprise one of a circular cross section, an elliptical or oblate cross section, an angular cross section, a teardrop or airfoil cross section, or any other cross section tending to minimize aerodynamic disturbance and/or pressure loss in a bypass flow. In various embodiments, angle θ may be between 90° and 45°, or may be between 80° and 55°, or may be between 70° and 65°.

Figure 15:
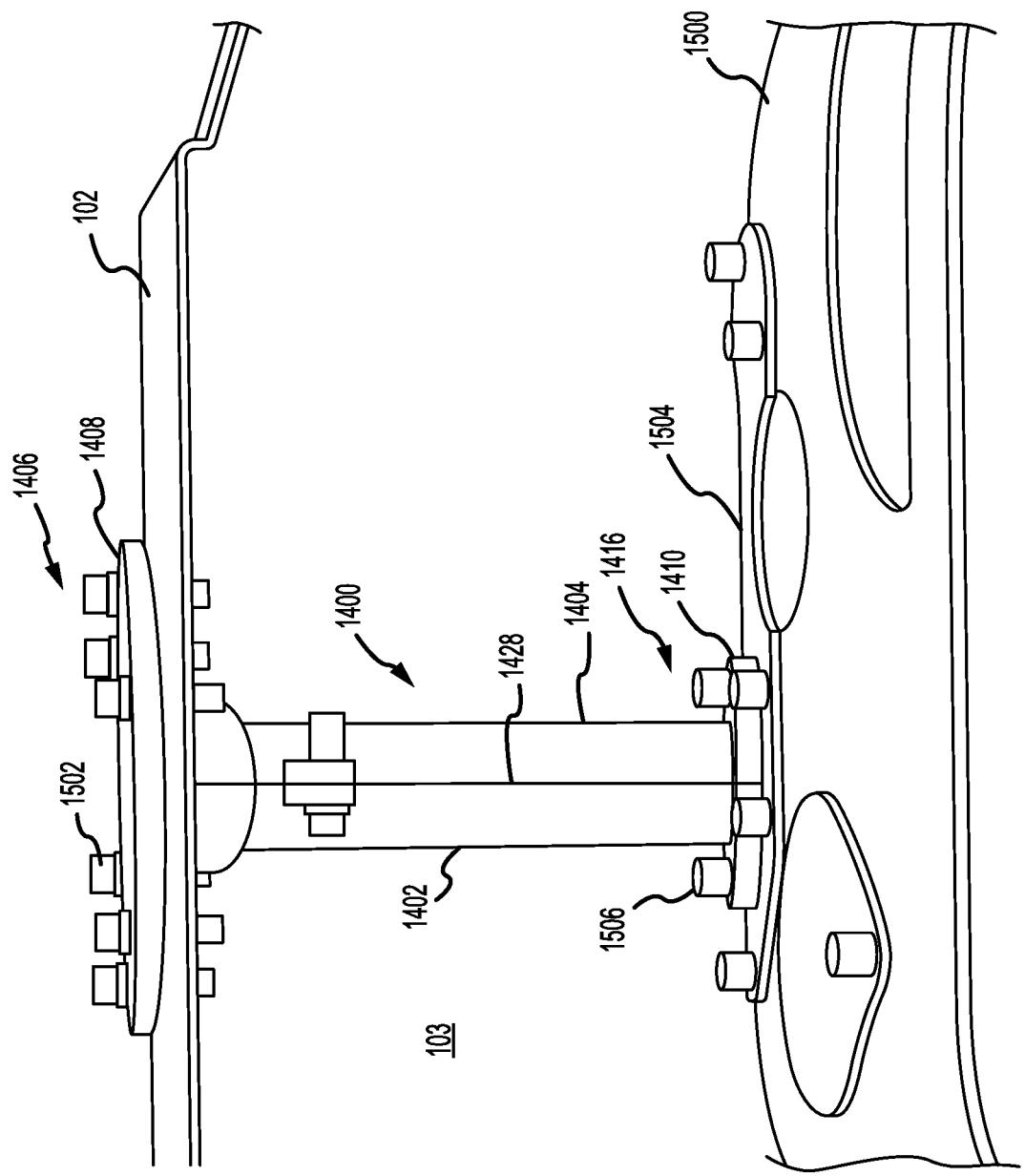
FIG. 15 illustrates a bypass flow duct having a cable conduit, in accordance with various embodiments.

In various embodiments and with additional reference to FIG. 15, bypass flow duct 103 is illustrated with cable conduit 1400 disposed therein in an installed configuration. Cable conduit 1400 is coupled between the outer case 102 and an inner case 1500. In various embodiments, the cable conduit 1400 is coupled to the outer case 102 proximate the foot end 1418 via the boot 1406 at the second flange 1408. In various embodiments, a plurality of fasteners 1502 may be disposed through the second flange 1408 and the outer case 102 thereby enabling the coupling between the second flange 1408 and the outer case 102. The cable conduit 1400 may be coupled to the inner case 1500 proximate the head end 1416 via that first flange 1410. In various embodiments, the inner case 1500 may include an inner case cover 1504. A plurality of fasteners 1506 may be disposed through the first flange 1410 and the inner case cover 1504 thereby enabling the coupling between the first flange 1410 and the inner case 1500.

Figure 16A:
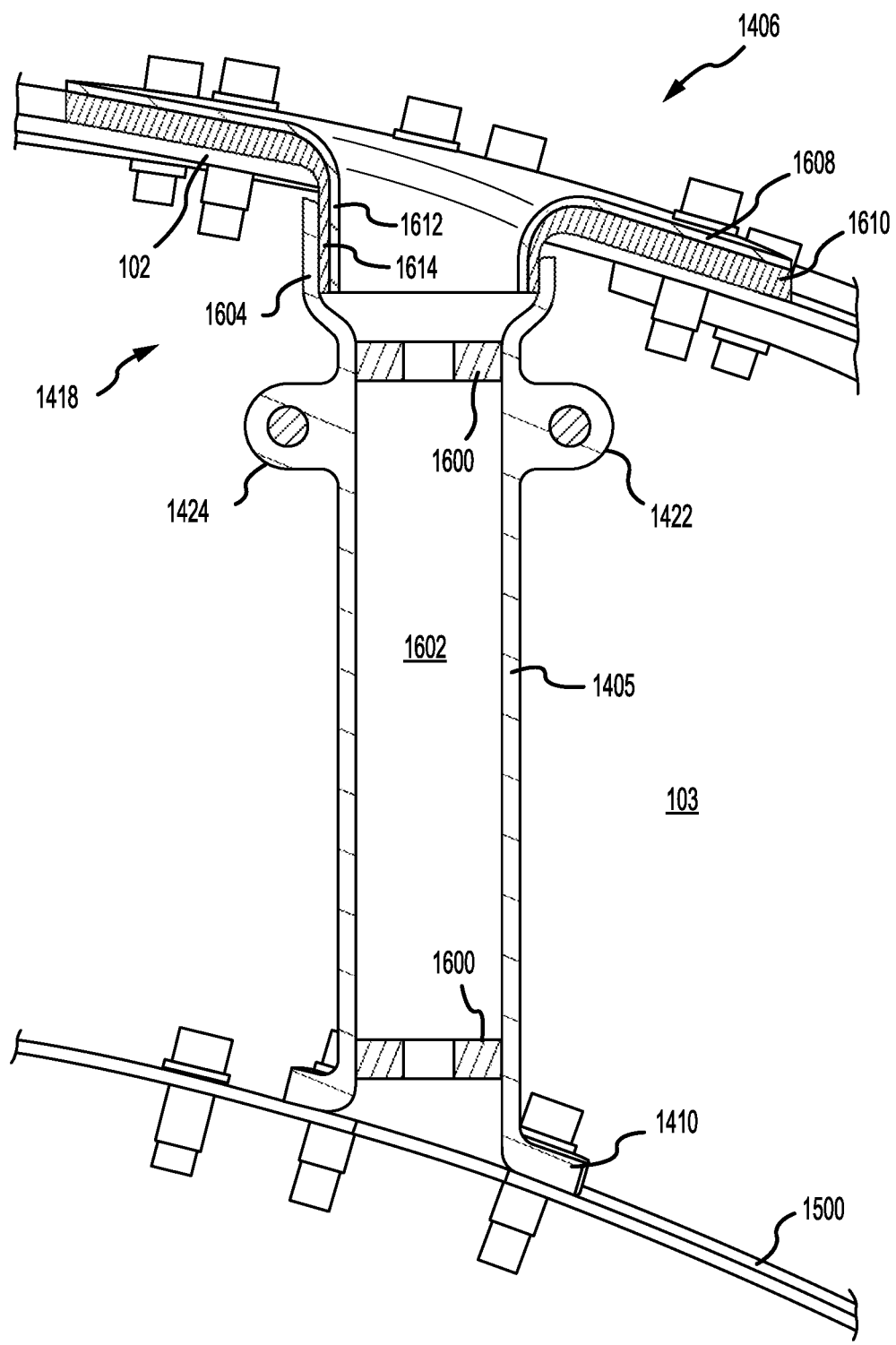
FIG. 16A illustrates a cross section of a bypass flow duct having a cable conduit, in accordance with various embodiments.
Figure 16B:
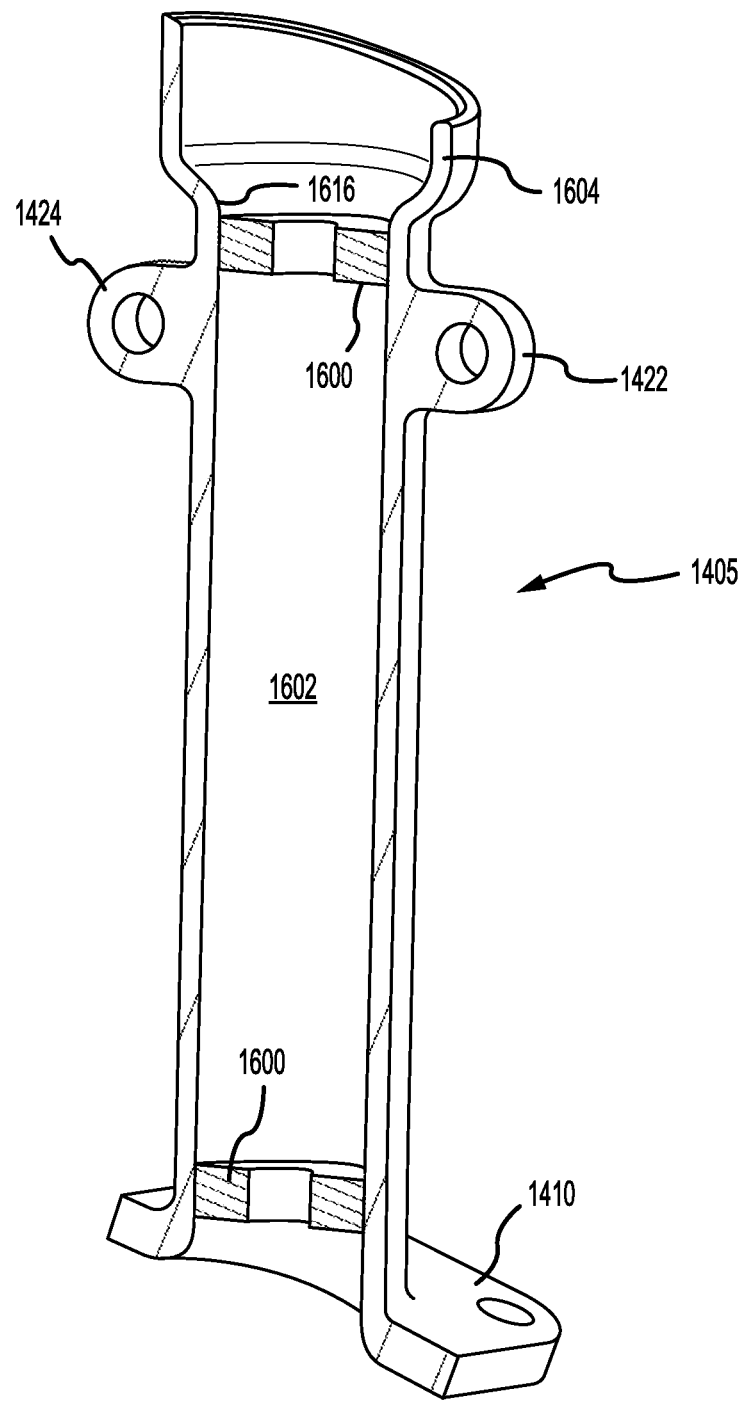
FIG. 16B illustrates a sleeve of a cable conduit in accordance with various embodiments.

In various embodiments and with additional reference to FIG. 16A, cable conduit 1400 is illustrated installed within the bypass duct 103 and in cross section through the separation plane 1428. Cable 1400' is omitted for the sake of clarity. In various embodiments, one or more split grommets 1600 are disposed within the interior volume 1602 of sleeve 1405. In various embodiments, split grommets 1600 comprises features, geometries, construction, manufacturing techniques, and/or internal components similar to split grommets 222, 600, 700, 800, and 900. In this regard, the split grommets 1600 tend to retain and isolate the cable 1400' within the interior volume 1602 of the sleeve 1405. In various embodiments, foot end 1418 of sleeve 1405 includes a flared portion 1604 configured to couple to the boot 1406. In various embodiments and with additional reference to FIG. 16B, sleeve 1405 is illustrated in cross section through the separation plane 1428. The flared portion 1604 is expanded relatively outward of the mean outer diameter of the sleeve 1405 defining a funnel-like opening into the interior volume 1602 of the sleeve 1405. A split grommet 1600 is disposed within the interior volume 1602 relatively axially between the coupling lobes (1422, 1424) and a transition portion 1616 between the mean sleeve diameter and the flared portion 1604.

Figure 16C:
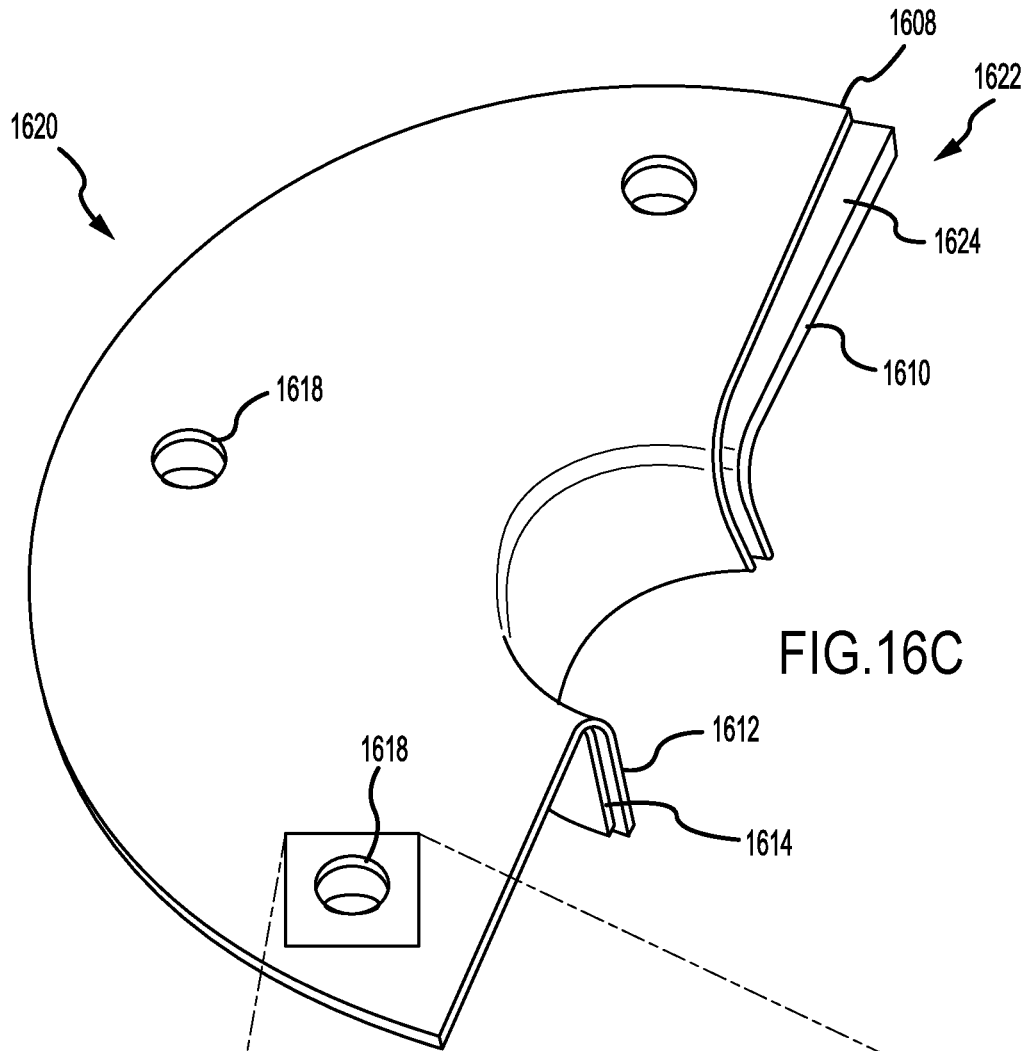
FIG. 16C illustrates a boot of a cable conduit in accordance with various embodiments.

In various embodiments and with additional reference to FIG. 16C, the boot 1406 may be split into sections such as, for example, a half section 1620 (i.e, a first half section and a second half section). In this regard, splitting the sleeve 1405 and the boot 1406 may tend to enable passage of relatively large cable 1400' end fittings through cable conduit 1400. The boot 1406 includes a pusher plate 1608 and a gasket 1610. The pusher plate 1608 material may be a relatively rigid material such as, for example, hard plastic, a ceramic, or a metallic material such as one of aluminum, aluminum alloy, titanium, titanium alloy, steel, stainless steel, or a nickel alloy. The gasket material may be a comparatively flexible and/or compressible material such as one of rubber, synthetic rubber, silicone rubber, polychloroprene, polyisoprene and/or the like. In various embodiments, the pusher plate 1608 may be stamped sheet metal. The pusher plate 1608 includes a first neck portion 1612 which extends relatively perpendicular to the plane of the pusher plate 1608.

The first neck portion 1612 defines an annular structure configured to couple with the flared portion 1604 and, in this regard, provides a passage into the interior volume 1602 of the sleeve 1405. In various embodiments, the gasket 1610 includes a second neck portion 1614 which extends relatively perpendicular to the plane of the gasket 1610. In the installed configuration, the gasket 1610 may be coupled relatively between the pusher plate 1608 and the outer case 102 enabling a gas seal therebetween. In like regard, the second neck portion 1614 may be coupled relatively between the first neck portion 1612 and the flared portion 1604 enabling a gas seal therebetween. The interior volume 1602 of the sleeve 1405 may thereby be isolated from the bypass flow duct 103 environment.

In various embodiments, the half section 1620 is split from the boot 1406 along a seamline 1622. The seamline 1622 includes an overlapping portion 1624 of the gasket 1610 material extending from the seamline. The overlapping portion 1624 is configured to couple with a corresponding portion of the pusher plate on the corresponding section. In this regard, the overlapping portion 1624 generates a tortuous path tending to inhibit seal leakage along the seamline 1622 of the half section 1620. Half section 1620 may include penetrations 1618 configured to receive fasteners 1502.

Figure 17:
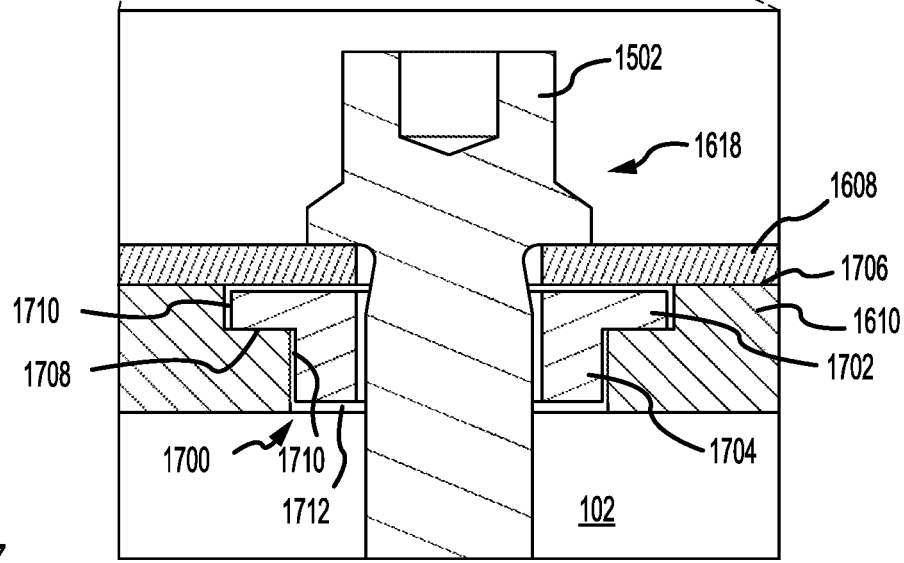
FIG. 17 illustrates details of a penetration of a boot of a cable conduit, in accordance with various embodiments.

In various embodiments and with additional reference to FIG. 17, a penetration 1618 is illustrated in cross section perpendicular to the plane of the pusher plate 1608. In various embodiments, a standoff washer 1700 is coupled to the gasket 1610 at the penetration 1618. The standoff washer includes a flanged portion 1702 and an annular wall 1704 extending perpendicular to the flanged portion 1702. In various embodiments, the gasket 1610 may be bonded to the pusher plate 1608 at a first bonding interface 1706. The gasket 1610 may include a recessed portion about the penetration 1618 configured to receive the flanged portion 1702 of the standoff washer 1700. In various embodiments, the flanged portion 1702 may be bonded to the recessed portion at a second bonding interface 1708 and thereby define a radial gap 1710 between the standoff washer 1700 and the gasket 1610. In this regard, the standoff washer 1700 may be embedded into the gasket 1610 below the pusher plate 1608

In various embodiments, the annular wall 1704 of the standoff washer 1700 may extend partially into the gasket 1610 and thereby define an axial gap 1712 between the standoff washer 1700 and the outer case 102. In response to applying a torque to the fastener 1502, the pusher plate 1608 is driven toward the outer case 102 tending to compress the gasket 1610. In response, the gasket 1610 tends to expand and close the radial gap 1710. In response to further application of torque to the fastener 1502, the annular wall 1704 of the standoff washer 1700 is driven across the axial gap 1712 to contact the outer case 102. In this regard, additional application of torque to the fastener 1502 is converted into a compressive force which flows through the annular wall 1704 of the standoff washer 1700 into the outer case 102. In this regard, the standoff washer 1700 may act as a grommet and tend to inhibit over compression of the gasket 1610. In various embodiments, the radial gap 1710 and the axial gap 1712 may be selected to enable a desired compression of the gasket 1610 tending thereby to improve the seal between the boot 1406 and the outer case 102 generated by the gasket 1610 in response to torqueing the fastener 1502. Stated another way, the standoff washer 1700 may be configured to inhibit over-compression of the gasket 1610.

In various embodiments, a method 1800 of assembling a cable conduit may include inserting cable 1400' through the outer case 102 and the inner case 1500 (step 1802). The forward section 1402 of the cable conduit may be inserted in to the bypass flow duct 103 and coupled to the inner case 1500 at the first flange 1410 (step 1804). The aft section 1404 may be inserted into the bypass flow duct 103 and coupled about the cable 1400' to the forward section 1402 via the coupling lobes (1422, 1424) (step 1806). The aft section 1404 may be coupled to the inner case 1500 at the first flange 1410 (step 1808). The first half section and the second half section of the boot 1406 may be coupled about the cable 1400' with the cable passing through the annular structure of the first neck portion 1612 (step 1810). The first neck portion 1612 may be inserted into the flared portion 1604 of the foot end 1418 and the boot 1406 may be coupled to the outer case 102 (step 1812). Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas turbine engine comprising:
a compressor section configured to compress a gas;
a combustor section aft of the compressor section and configured to combust the gas;
a fan section configured to produce a bypass flow;
an outer case having an inner surface and an inner case having an outer surface defining a bypass flow duct there between; and
a cable conduit, disposed within the bypass flow duct, comprising:
a head end, a sleeve having a foot end, a boot, and a split grommet,
wherein the head end is coupled to the sleeve opposite the foot end,
wherein the boot comprises a first flange and a neck,
wherein the neck is coupled to a flared portion of the foot end,
wherein the head end comprises a second flange having and a cutout penetrating into an interior volume of the sleeve,
wherein the split grommet is coupled within the interior volume of the sleeve, and
wherein the second flange is coupled the inner case and the first flange is coupled to the outer case.

2. The gas turbine engine of claim 1, wherein the cable conduit further comprises a forward section and an aft section, wherein the sleeve comprises coupling lobes.

3. The gas turbine engine of claim 2, wherein the forward section comprises a first perforation through a forward aerodynamic surface and the aft section comprises a second perforation through an aft aerodynamic surface, wherein the first perforation and the second perforation are in fluid communication with the bypass flow duct and the interior volume of the sleeve, wherein a portion of the bypass flow passes through the first perforation into the interior volume and exits the interior volume through the second perforation.

4. The gas turbine engine of claim 3, wherein the boot comprises a first half section and a second half section separable at a seamline.

5. The gas turbine engine of claim 4, wherein the boot comprises a pusher plate and a gasket.

6. The gas turbine engine of claim 5, wherein a standoff washer is embedded into the gasket.

7. The gas turbine engine of claim 6, wherein the sleeve comprises a sleeve locking feature.

8. The gas turbine engine of claim 6, wherein the split grommet comprises a mating surface comprising at least one of an extrusion, a finger, a cavity, a pocket, a bore, or an embedded stud.

9. The gas turbine engine of claim 6, wherein the gasket comprises a recessed portion configured to receive a flanged portion of the standoff washer, wherein the standoff washer defines a radial gap between the standoff washer and a gasket material.

\* \* \* \* \*